United States Patent [19]
Kikuta et al.

[11] Patent Number: 5,927,874
[45] Date of Patent: *Jul. 27, 1999

[54] PRINTING APPARATUS AND PRINTING METHOD

[75] Inventors: Masaya Kikuta, Ohta-ku; Tsutomu Yamazaki, Chigasaki, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/449,246

[22] Filed: May 24, 1995

[30] Foreign Application Priority Data

May 30, 1994 [JP] Japan ................................. 6-117114

[51] Int. Cl.$^6$ ....................................................... B41J 2/00
[52] U.S. Cl. ............... 400/120.02; 395/115; 395/497.04; 347/5; 347/172; 347/211
[58] Field of Search ......................... 400/120.02, 124.01, 400/303; 395/114, 115, 474, 497.01, 497.04; 347/5, 172, 211

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,674,895 | 6/1987 | Tanaka et al. ........................... 400/303 |
| 4,723,129 | 2/1988 | Endo et al. . |
| 4,740,796 | 4/1988 | Endo et al. . |
| 4,953,995 | 9/1990 | Sims et al. ............................... 400/121 |
| 5,450,532 | 9/1995 | Bockman ................................ 395/115 |

FOREIGN PATENT DOCUMENTS

| | | |
|---|---|---|
| 0142098 | 5/1985 | European Pat. Off. . |
| 0530953 | 3/1993 | European Pat. Off. . |
| 0551095 | 7/1993 | European Pat. Off. . |
| 54-56847 | 5/1979 | Japan . |
| 59-123670 | 7/1984 | Japan . |
| 59-138461 | 8/1984 | Japan . |
| 60-71260 | 4/1985 | Japan . |
| 53-09875 | 11/1993 | Japan . |

Primary Examiner—Eugene Eickholt
Attorney, Agent, or Firm—Fitzpatrick, Cella, Harper & Scinto

[57] ABSTRACT

A printing apparatus capable of high-speed printing with low costs. Upon printing on a recording sheet based on print data inputted from an external device, print-buffer allocation is controlled in such manner that existence/absence of print data with respect to a printing area of a recording sheet is examined by a unit of print buffer capacity, and if there is no print data for a printing area, no print buffer is allocated to printing by a print head in the printing area. This control is managed by a print buffer management table in which an ID number of an allocated print buffer and information indicative of a state no print buffer is allocated are stored.

33 Claims, 23 Drawing Sheets

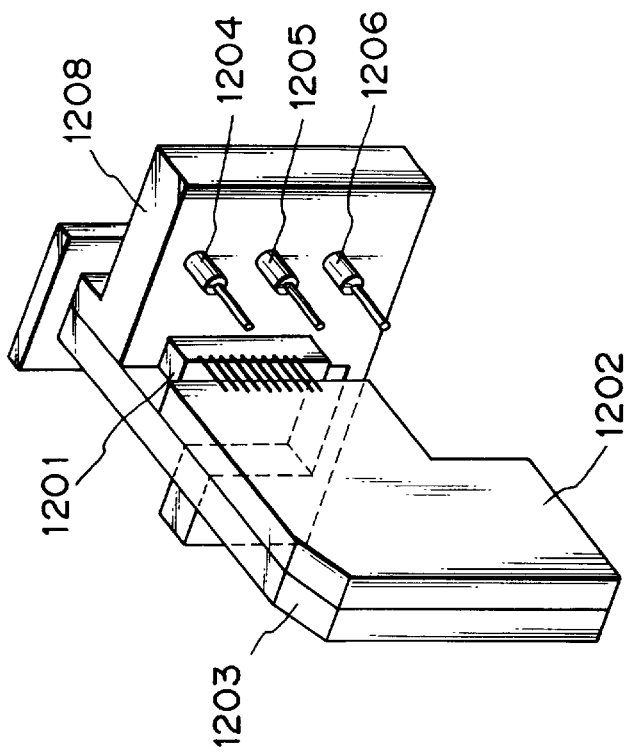
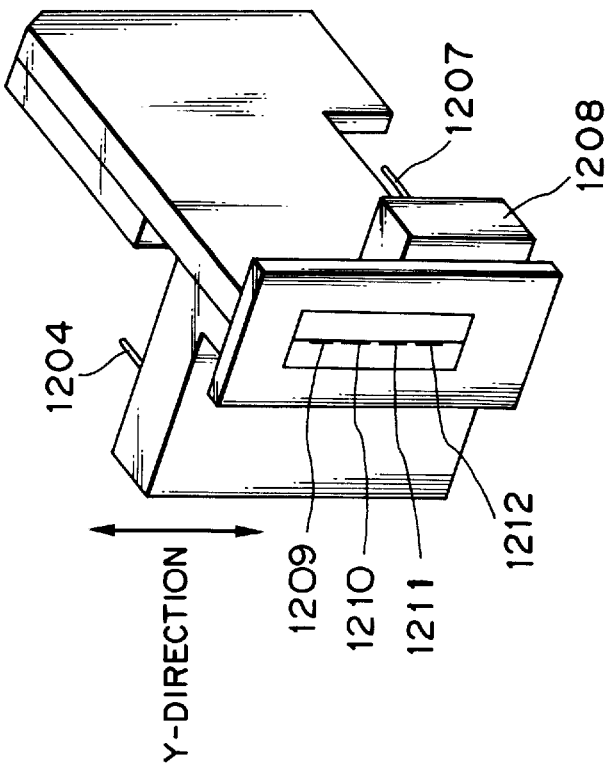

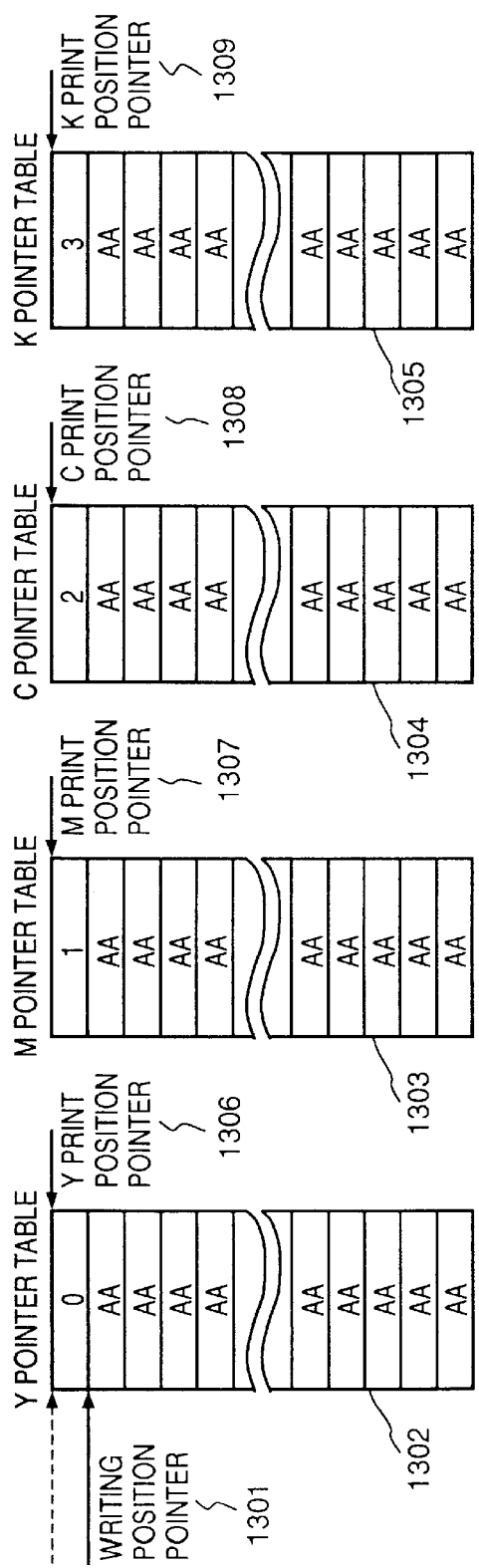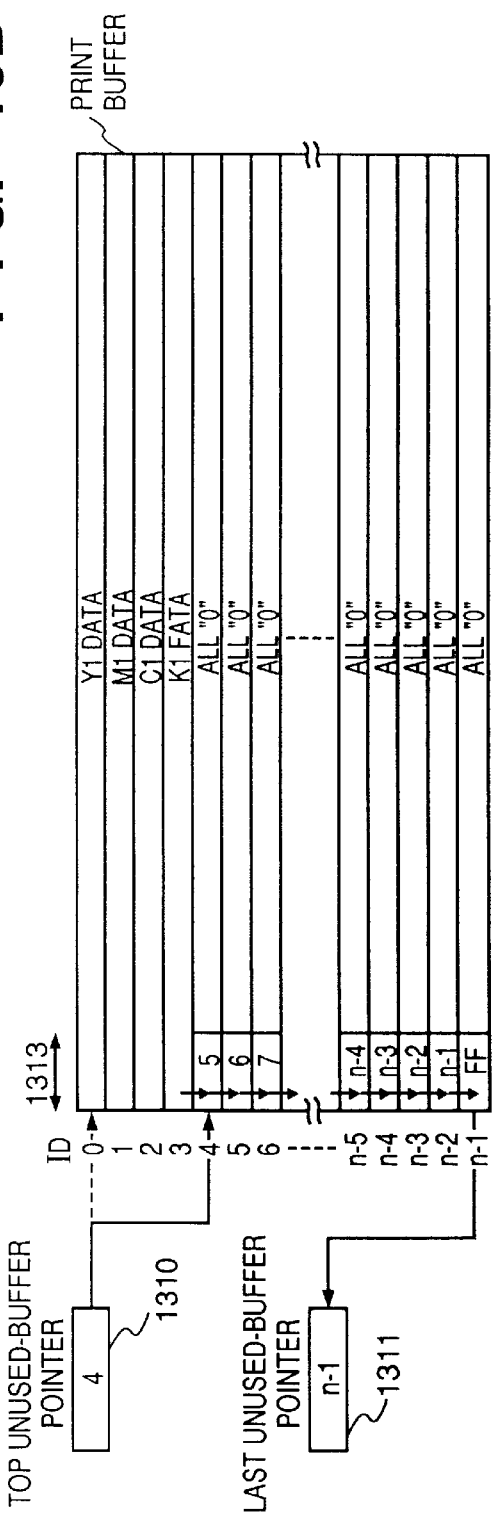

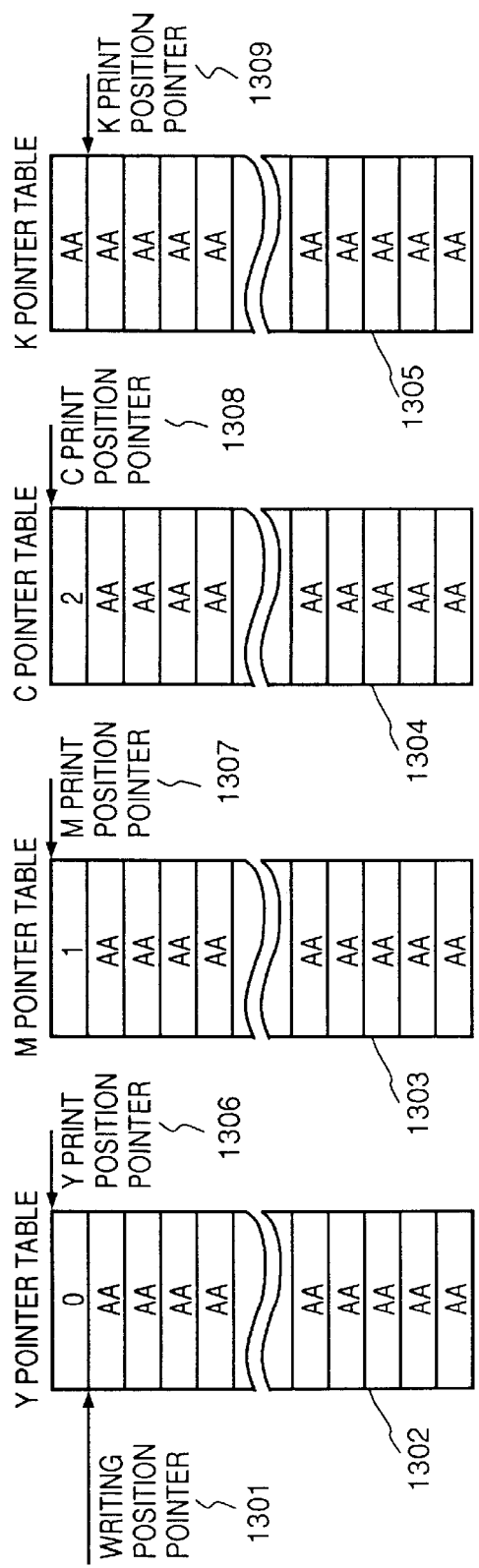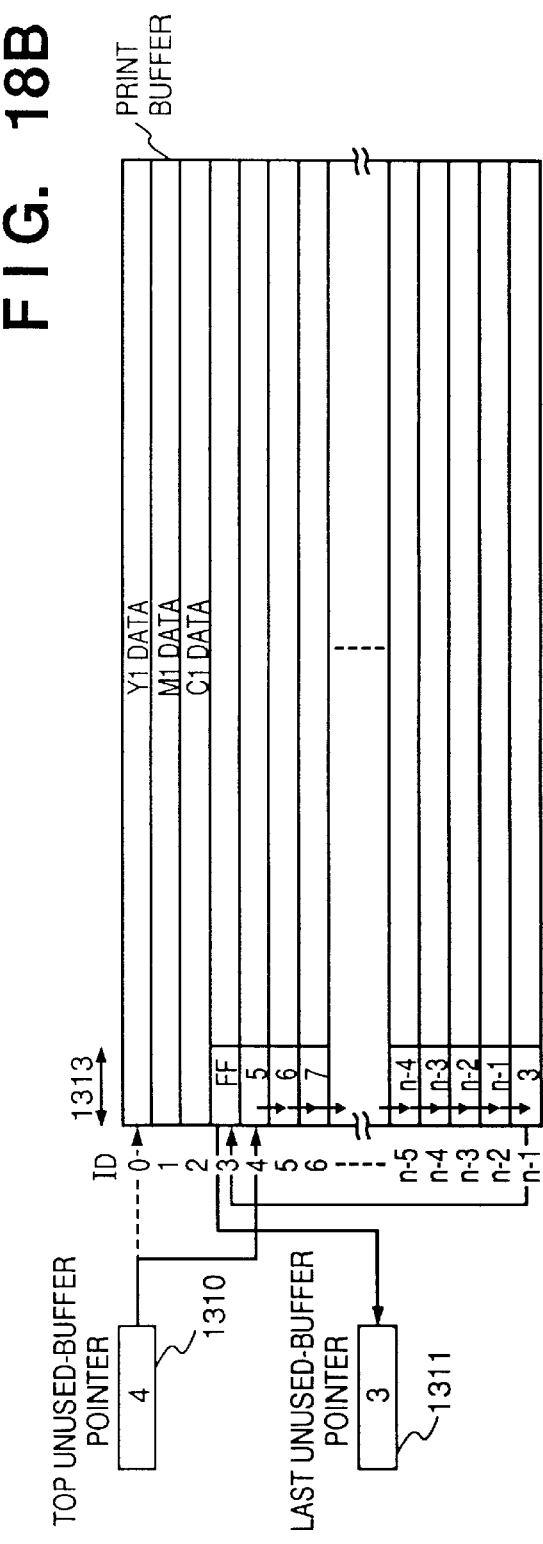

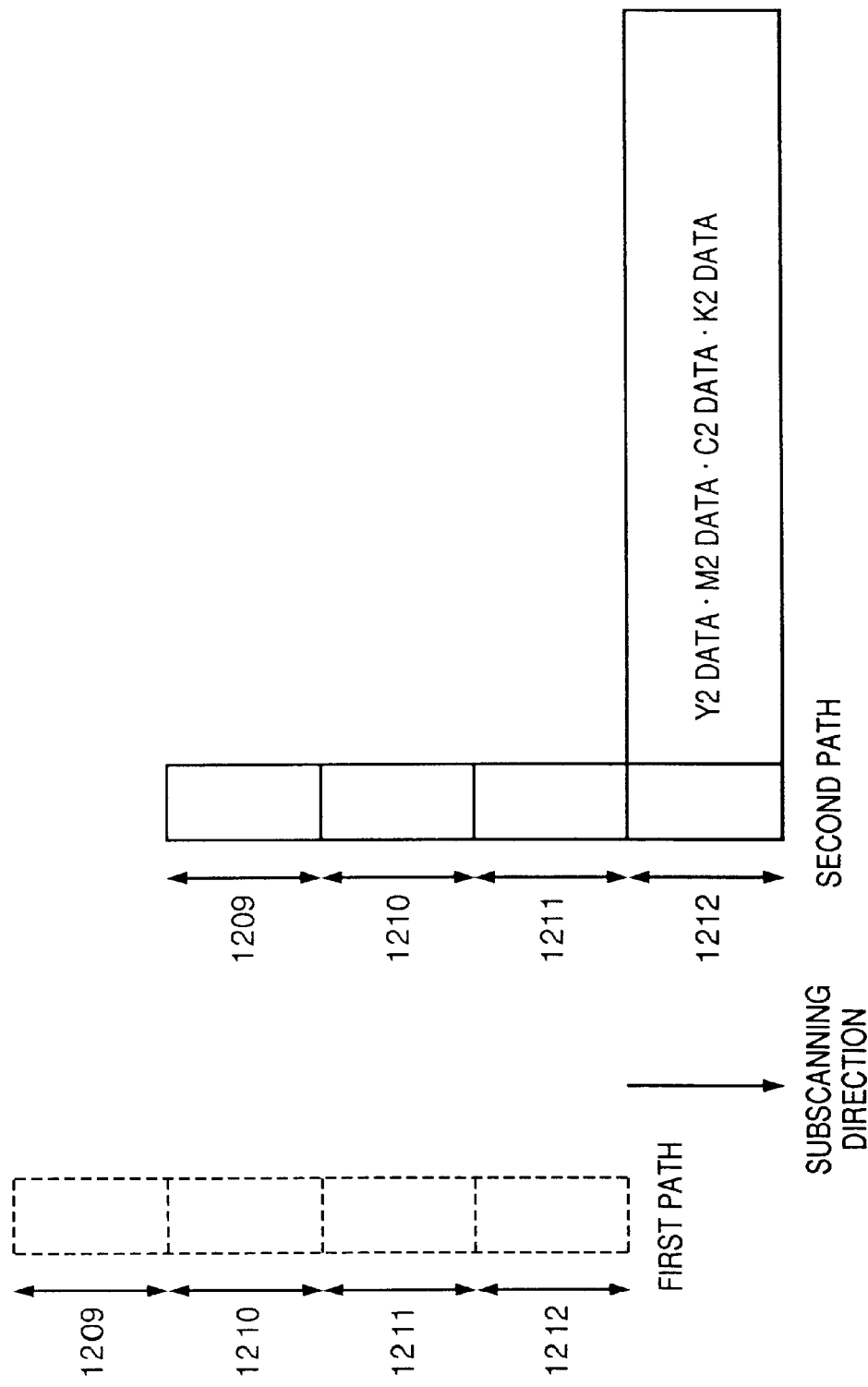

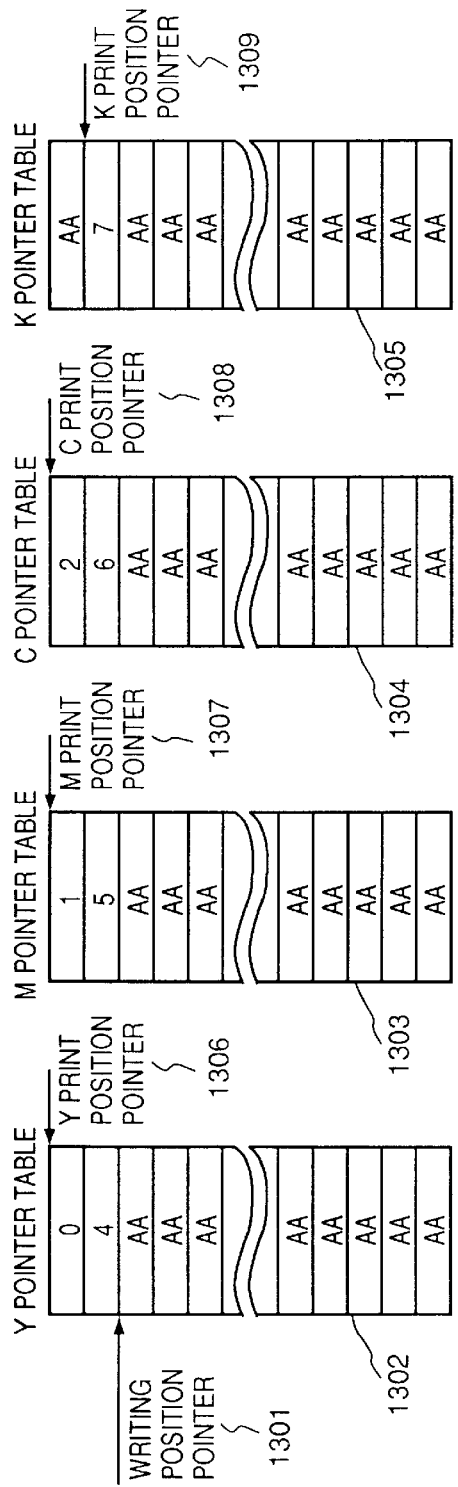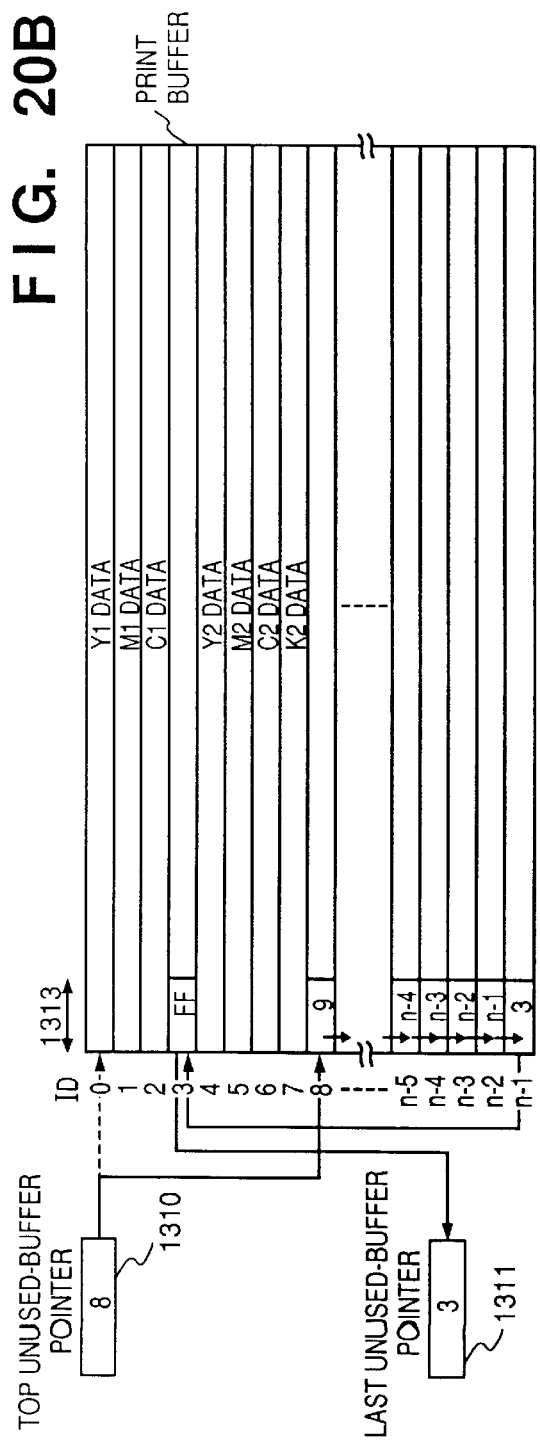

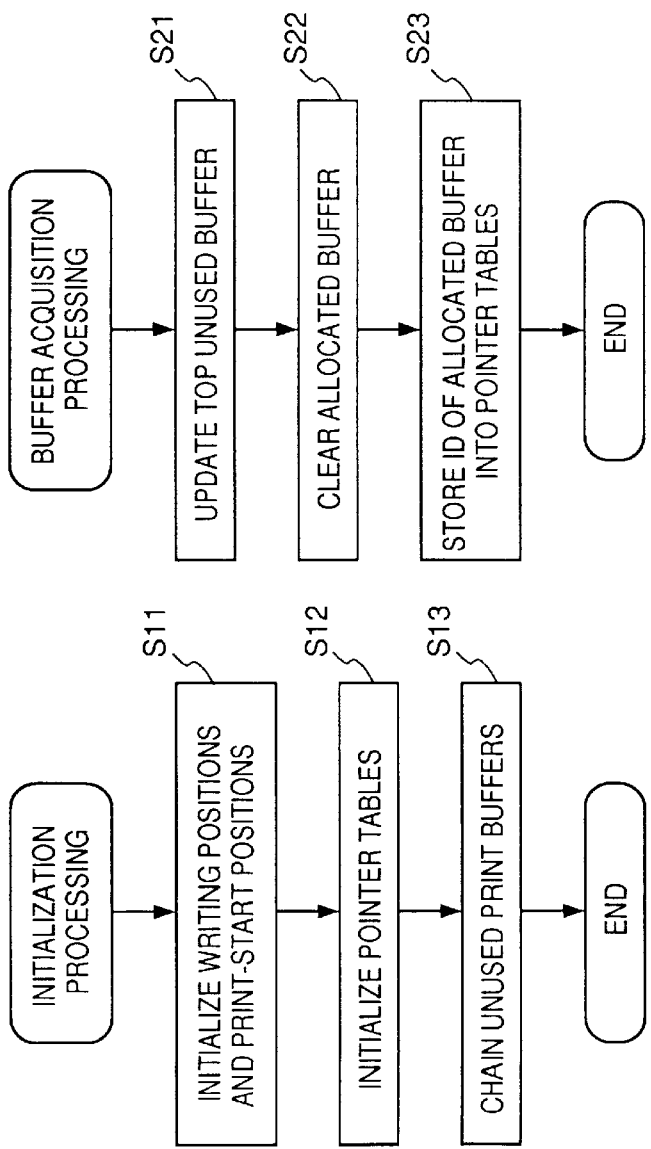
FIG. 23C / FIG. 23B / FIG. 23A

PRINTING APPARATUS AND PRINTING METHOD

BACKGROUND OF THE INVENTION

Present invention relates to a printing apparatus and a printing method and, more particularly to a print buffer control for a printing apparatus which comprises a print head having an array of printing elements in the same direction as a direction where recording medium is shifted.

A conventional serial printer, which moves a carriage having a print head in a horizontal direction (main-scanning direction) orthogonal to a recording-medium transferring direction (subscanning direction), has a buffer memory for storing print data, and the memory size of the buffer memory is corresponding to the recording-medium width or longer in the main-scanning direction and the length of the array of printing elements or longer in the subscanning direction.

When printing an image on a recording sheet, print data stored in the buffer memory is transferred to the print head, and at the same time, the print head is scanned in the main-scanning direction. In such printers, a printer having an ordinary printing speed has one buffer memory as described above, however, a printer for high-speed printing has two or more buffer memories to raise printing speed by alternatively using the buffer memories, i.e., writing print data into an unused buffer memory while performing printing operation.

However, in the above high-speed printer, if an effective printing area which can be printed in one scanning of the print head is increased for higher printing speed, the width of the print head in the subscanning direction becomes longer. This increases the capacity of the buffer memory. Further, the above-described double-buffer control requires at least two large capacity buffer memories. Likewise, a triple-buffer requires three large-capacity buffer memories.

In a case where this high-speed printing method is applied to a color printer, the memory capacity becomes four times larger than that in the above case, in consideration of the number of printing materials such as C (cyan), M (magenta), Y (yellow) and K (black) inks.

The increase of buffer memory capacity raises production costs, therefore, a print buffer control method which reduces costs in manufacturing a high-speed printer is highly desired.

Furthermore, in printing characters, a conventional printing operation requires a large area in a buffer memory in a case when there is a relatively large vacant area between the lines of character strings. Thus, it is highly desired to improve an utilization efficiency of buffer memory which has a size corresponding to a recording width of a print head.

SUMMARY OF THE INVENTION

The present invention has been made in consideration of the above situation, and has as its object to provide a printing apparatus that can be manufactured with a low cost and that can perform high-speed printing.

It is another object of the present invention to provide a printing apparatus and a printing method capable of efficiently utilizing a buffer memory.

According to the present invention, the above object is attained by providing an printing apparatus which performs printing by scanning a print head, comprising an array of printing elements, in a direction different from a direction along the array of printing elements, comprising; a plurality of memory means for storing print data to be used for printing on a printing medium, in correspondence with the printing elements divided into a plurality of element groups; and control means for allocating the plurality of memory means to the element groups respectively, wherein when no print data to be used for printing using the printing element groups is received, the control means allocates none of the plurality of memory means to the element groups.

In accordance with the present invention as described above, when there is no print data corresponding to any of the printing element groups divided from the plurality of printing elements, none of the plurality of memory means is allocate to any printing element group.

According to another aspect of the present invention, the foregoing object is attained by providing an printing method for performing printing by scanning a print head, comprising an array of printing elements, in a direction different from a direction along the array of printing elements, comprising the steps of: providing a plurality of memory areas allocated to the printing elements divided into a plurality of element groups respectively; inputting print data; storing the input print data into the memory areas; allocating the memory areas to the element groups when the print data stored in the memory areas includes print data to be used for printing using the element groups; and allocating none of the memory areas to any of the element groups when the print data stored in the memory areas do not include print data to be used for printing using the element groups.

In accordance with the invention as described above, memory areas are allocated to a plurality of printing element groups, based on whether or not print data stored in the memory area includes print data to be used for printing using the element groups.

The invention is particularly advantageous since when there is no print data corresponding to any of the printing element groups, none of the memory means is allocated to any of printing element group. In this manner, the memory means are efficiently used for storing data. Thus, the invention can provide a printing apparatus which has memory means with small memory capacity and which can be manufactured with low costs.

Further, according to another aspect of the present invention, the allocation of the plurality of memory means is made with respect to all the color component data simultaneously, and the release of the allocated memory means is made by each color component data, based on the contents of color print data to be used for printing by the print head on the printing medium, which attains precise control on the memory allocation and the release of allocated memory. In this manner, the plurality of memory means for storing print data are efficiently used. Thus, the present invention can provide a color printing apparatus which has memory means with small memory capacity and which can be manufactured with low costs.

In any aspect of the present invention, a print head having a plurality of printing elements aligned in a direction where a recording medium is transferred is used. This results in high-speed printing operation, thereby enabling to provide an inexpensive but high-speed printing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10A is a front perspective view of the print head 102 capable of color printing according to the third embodiment;

FIG. 10B is a back perspective view of the print head 102 in FIG. 10A;

FIG. 16A is a block diagram showing the logical structure of a management table 1107 according to the third embodiment;

FIG. 16B is a block diagram showing the logical structure of print buffers according to the third embodiment;

FIG. 18A is a block diagram showing the logical structure of a management table 1107 according to the third embodiment;

FIG. 18B is a block diagram showing the logical structure of print buffers according to the third embodiment;

FIG. 19 is an explanatory view showing the relation between print-data transfer for a second path of the print head and control of recording-sheet transfer for the second path;

FIG. 20A is a block diagram showing the logical structure of a management table 1107 according to the third embodiment;

FIG. 20B is a block diagram showing the logical structure of print buffers according to the third embodiment;

FIGS. 23A to 23C are flowcharts showing buffer management control processing according to the third embodiment.

DETAILED DESCRIPTION OF THE PREFERRED EMBODIMENT(S)

Preferred embodiments of the present invention will be described in detail in accordance with the accompanying drawings.

General Embodiment

Figure 1:
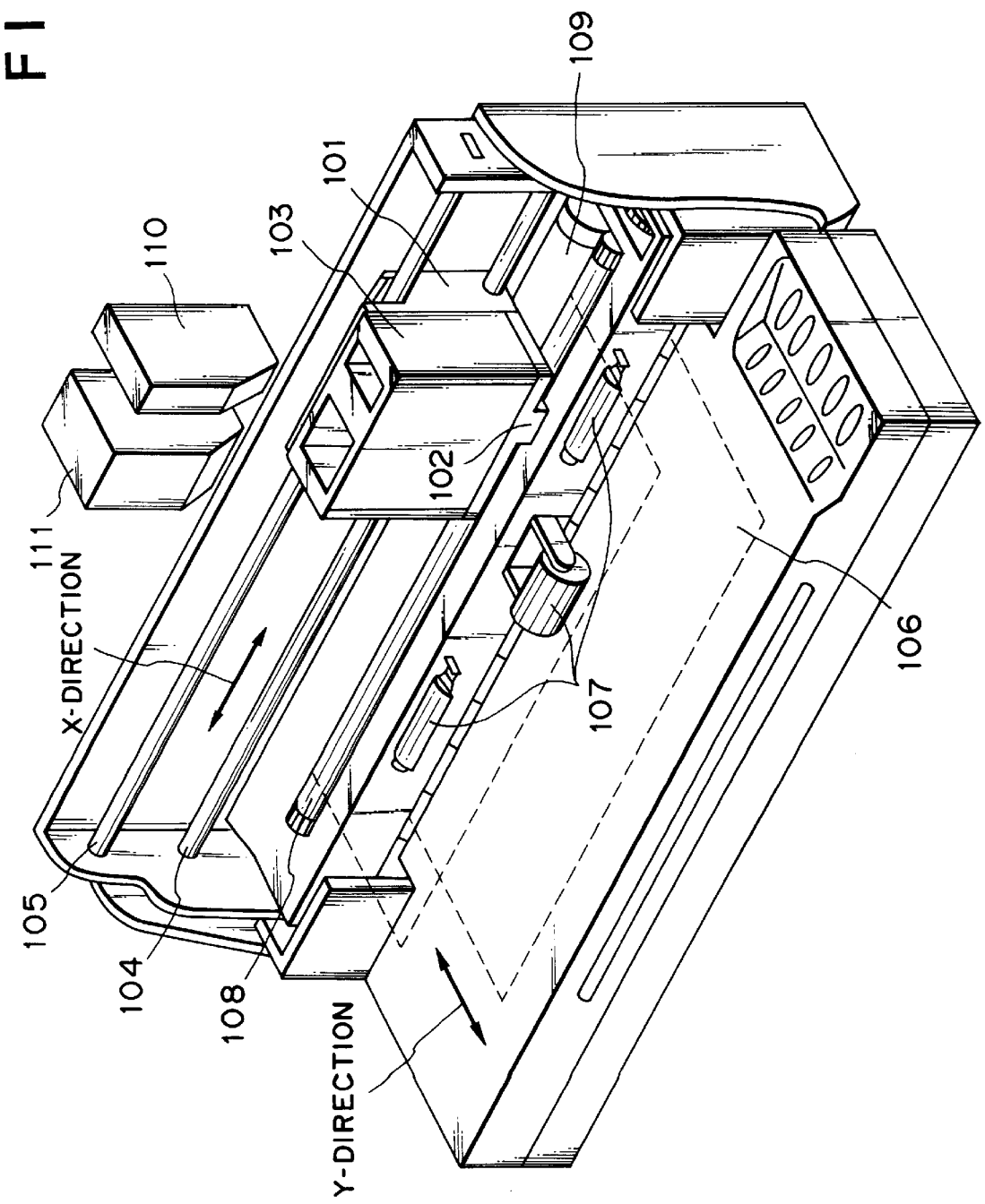
FIG. 1 is an overview of an ink-jet printer commonly used in first to third embodiments of the present invention.

FIG. 1 shows an ink-jet printer commonly used in the following three embodiments. The ink-jet printer is capable of both black-and-white monochromatic printing and color printing. In a case where the printer is used as a monochromatic printer, the printer is mounted with only an ink cartridge containing black ink as described below.

As shown in FIG. 1, a carriage 101 has a multi-nozzle print head 102 including 128 nozzles and a cartridge guide 103. The print head 102 discharges black (K) ink, otherwise, cyan (C), magenta (M), yellow (Y) and black (K) inks. Upon printing operation, the print head 102 installs an ink cartridge 110 containing the black ink and ink cartridge containing the other three color inks. The respective cyan (C), magenta (M), yellow (Y) and black (K) inks are supplied from the respective ink cartridges, and driving signals for the respective nozzles of the print head are supplied via a flexible cable (not shown) having a lot of leading lines.

The carriage 101 is arranged on two guide rails 104 and 105, and is reciprocally moved in an X-direction (hereinafter referred to as "main-scanning direction") with an endless belt 109, connected to the carriage 101, driven by a carrier motor (to be described later). The recording sheet 106 is properly tensioned by a guide roller 107, for smooth transfer. A conveying roller 108 is driven by a transfer motor (to be described later) to transfer the recording sheet 106 in a Y-direction (hereinafter referred to as "subscanning direction").

Figure 2:
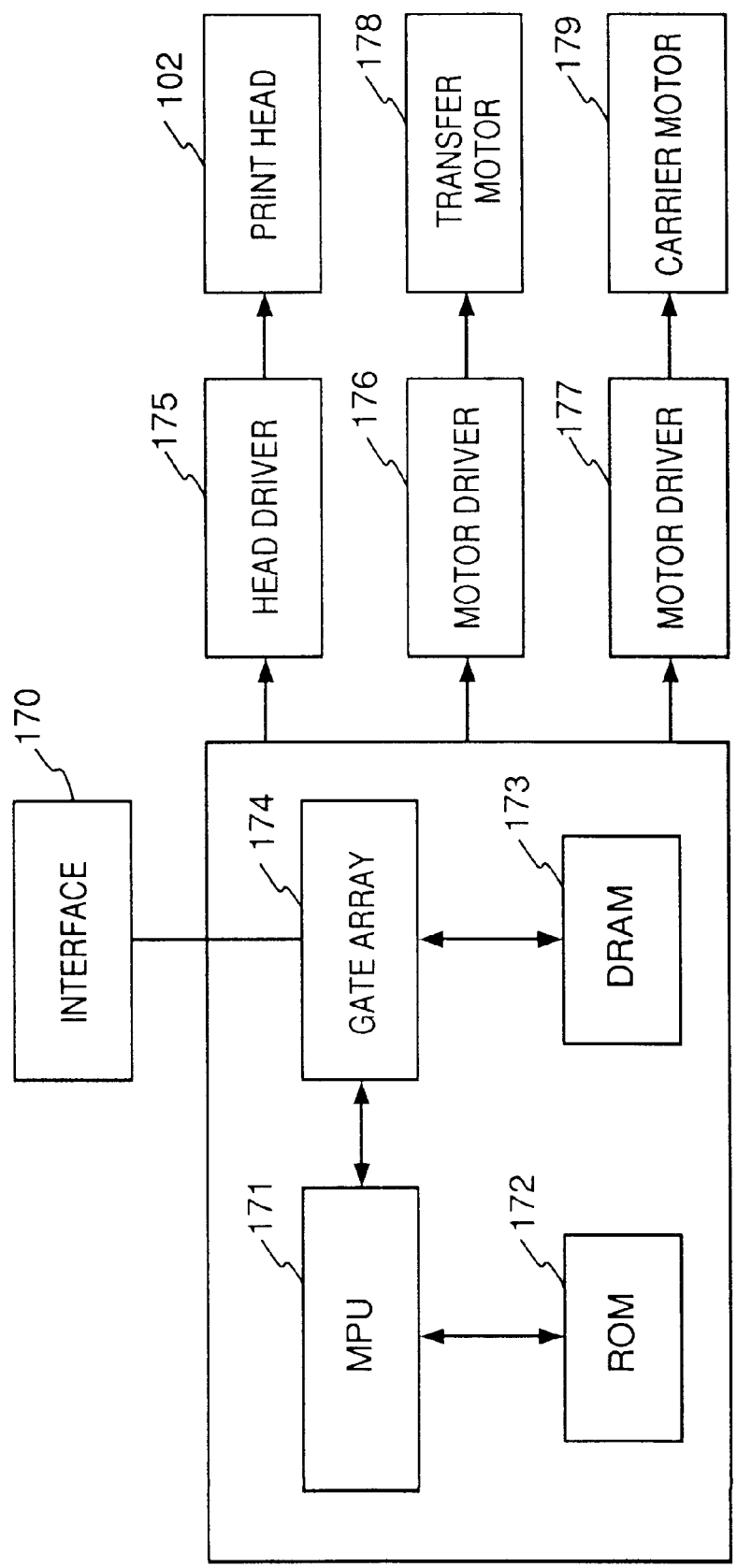
FIG. 2 is a block diagram showing the construction of a controller of an ink-jet printer.

FIG. 2 is a block diagram showing the arrangement of a control circuit of the ink-jet printer. In FIG. 2, reference numeral 170 denotes an interface for inputting a printing signal from an external unit such as a host computer; 171, an MPU; 172, a ROM for storing a control program executed by the MPU 171 (including character fonts if necessary); and 173, a DRAM for temporarily storing various data (the printing signal, printing data supplied to the print head, and the like). Reference numeral 174 denotes a gate array (G.A.) for performing supply control of printing data to the print head 102. The gate array 174 also performs data transfer control among the interface 170, the MPU 171, and the RAM 173. Reference numeral 179 denotes a carrier motor for transferring the print head 102 in the main scanning direction; and 178, a transfer motor for transferring a printing sheet. Reference numeral 175 denotes a head driver for driving the print head; and 176 and 177, motor drivers for driving the transfer motor 178 and the carrier motor 179.

The operation of the above control arrangement will be described below. When a printing signal is inputted to the interface 170, the printing signal is converted into print data for printing operation between the gate array 174 and the MPU 171. The motor drivers 176 and 177 are driven, and the print head is driven in accordance with the printing data supplied to the head driver 175, thus performing the printing operation.

First Embodiment (FIGS. 3 to 6)

Next, printing in a case where the above-described ink-jet printer is used as a black-and-white monochromatic printer and a monochromatic image and characters are printed on the recording sheet 106 will be described.

Figure 3:
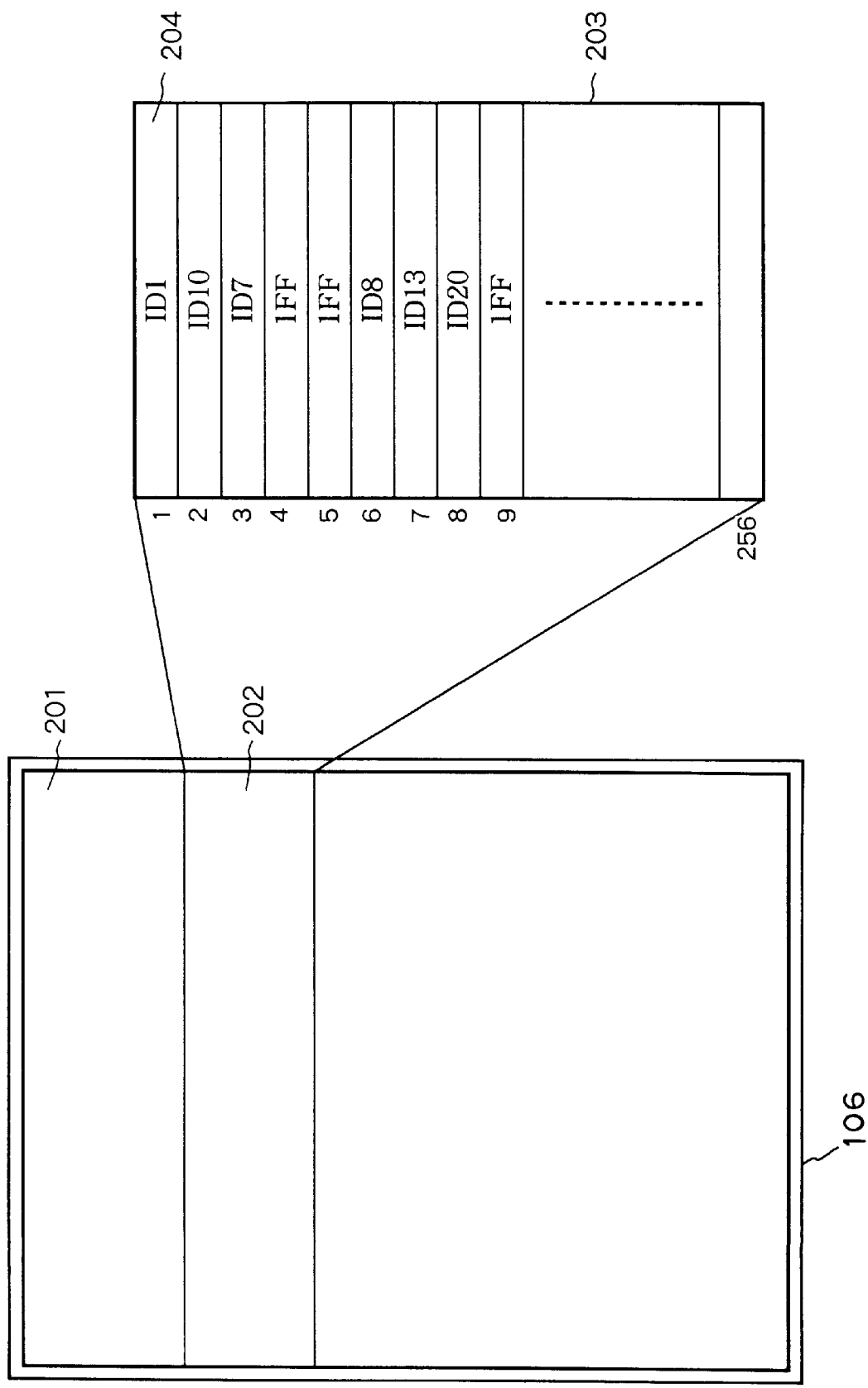
FIG. 3 is an explanatory view showing the relation between an effective printing area 201 and a scan-print area 202 on which printing is performed at one scanning by a print head 102, both on the recording sheet 106, according to the first embodiment.

FIG. 3 shows the relation between an effective printing area 201 of the recording sheet 106 and a scan-print area 202 on which printing is performed at one scanning in the main-scanning direction by the print head 102. For the purpose of printing on the scan-print area 202, the present embodiment employs a plurality of print buffers (to be described in detail later) for temporarily storing data used for printing on the recording sheet, and employs a print-buffer management table 203 as shown in FIG. 3 for managing use of the plurality of print buffers. The print-buffer management table 203 has cells 204, each corresponding to each nozzle of the print head 102, each for storing a print-buffer ID number (IDn) or a flag indicative of a state where no buffer is allocated (1FF). The ink-jet printer of this embodiment uses 150 print buffers, and the print-buffer management table 203 has 256 cells. The print-buffer management table 203 is ring-structured for cyclic use.

Figure 4:
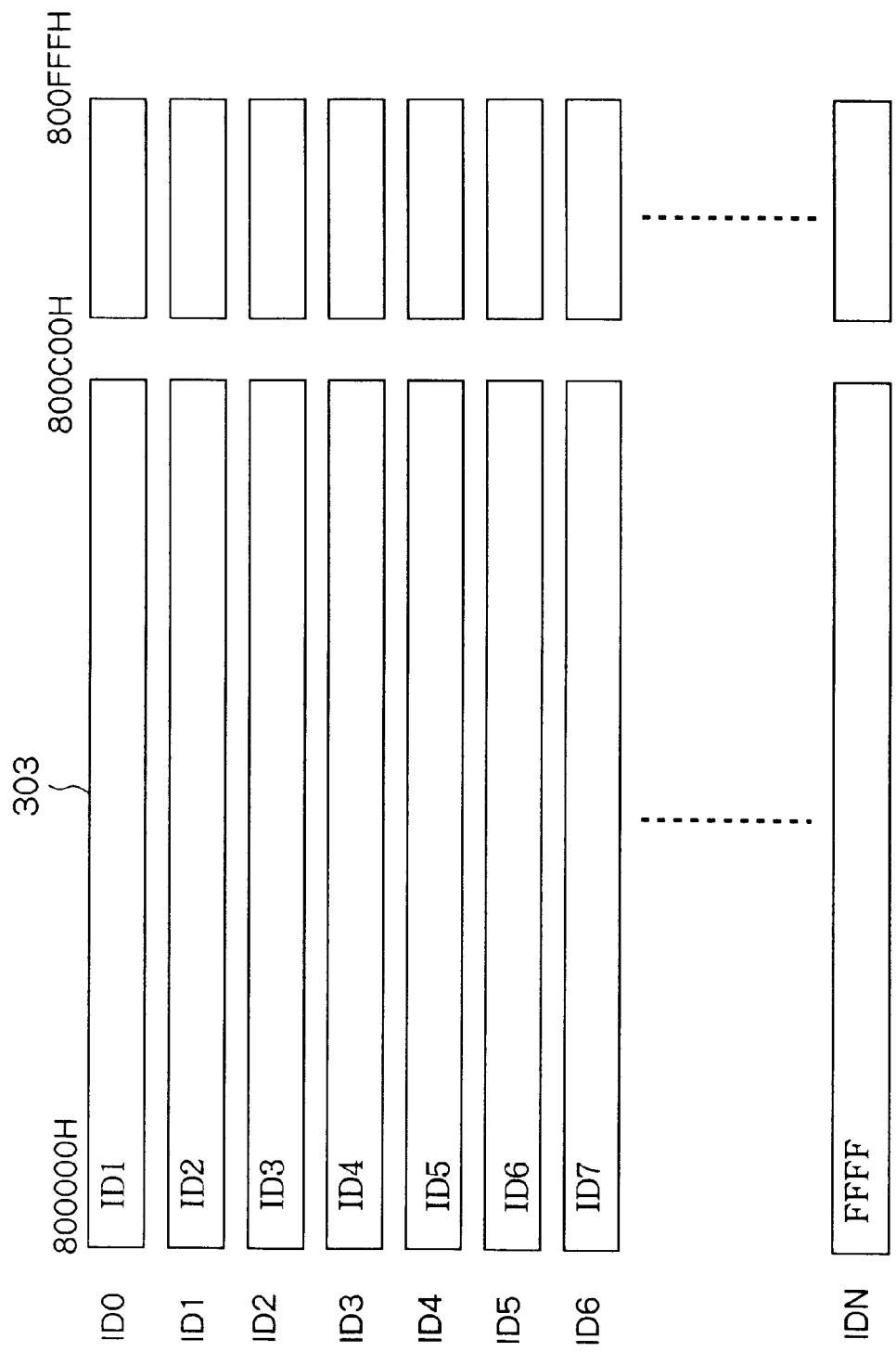
FIG. 4 is a block diagram showing the structure of a print buffer according to the first embodiment.

FIG. 4 shows the construction of one print buffer. The print buffers respectively have a data-writing area 303, which has a memory capacity for printing in the horizontal (main-scanning) direction at a printing density of 360 DPI, by the width of an A4-sized sheet (210 mm), using 8-bit (1 byte) data in the vertical (subscanning) direction, i.e., 3 Kbytes.

In this embodiment, the print head 102 has 128 nozzles aligned in the subscanning direction. Since the print-buffer management table 203 manages print buffers in one buffer units (i.e., 8-dot units in the subscanning direction), this management system as a whole is able to manage print buffers necessary for two scannings by the print head 102. Note that 150 print buffers correspond to approximately 9 scanning lines.

The print buffers respectively have a unique buffer ID number (0, 1, 2, . . . , N). As shown in FIG. 4, the memory area of the DRAM 173 is divided into 4 Kbyte-areas as the print buffers, and the print buffers are sequentially allocated for storing data, with a memory address "800000 (H: hexadecimal representation)" of the DRAM 173 as a start address. The memory allocation is made with respect to addresses continued from the start address, then the header address of a print buffer having an arbitrary ID number in the DRAM 173 is 800000 (H)+ID number×1000 (H). The respective print buffers input the next ID number at the header address of each buffer upon initial setting. For example, "ID1" is set as a print buffer following a print buffer "ID0". Note that as an ID number of the final print buffer, "FFFFF" is set to indicate the final buffer, thereby making all the print buffers endlessly chained.

On the other hand, the DRAM 173 has a next-ID storage area for storing the ID number of a print buffer to be used next, for the purpose of managing the order of used print buffers. An ID number stored in this next-ID storage area is sequentially updated each time print data is written into a print buffer. That is, an ID number of a print buffer to be used next is always set at this area. If the final buffer is detected in accordance with the progress of use of print buffers, an ID number of the initial print buffer is set as the next buffer ID number. In this manner, in printing operation, print buffer management is made by always identifying a print buffer in which data is written next. This information is maintained in a sequence of printing operations.

Further, in printing, when data transfer to the print head is completed, the content of a print buffer which has become unnecessary is cleared for the next printing. The print buffers are periodically used, a plural number of times, in a printing sequence.

Figure 5:
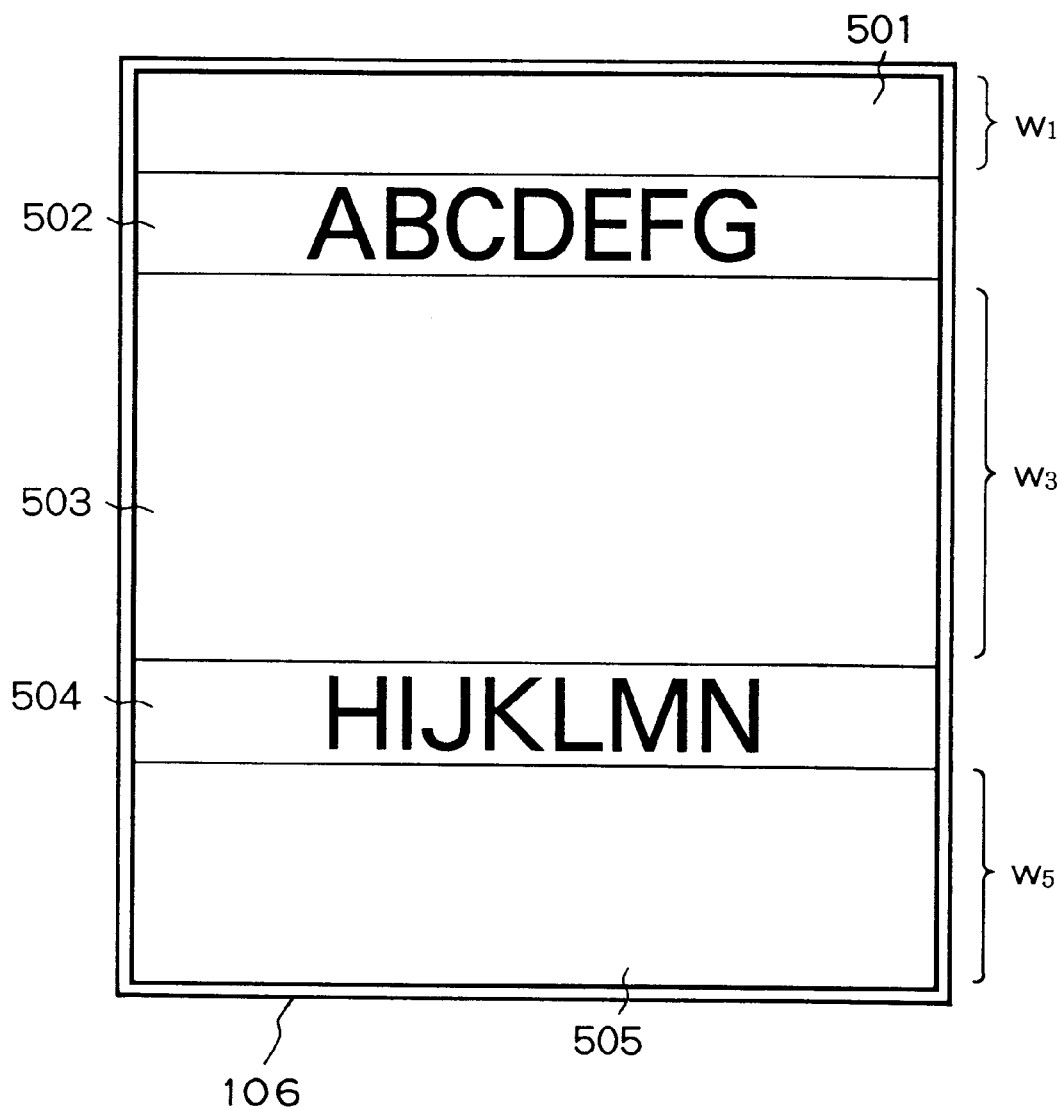
FIG. 5 is an example of a print out according to the first embodiment, where characters "ABCDEFG" and "HIJKLMN" are printed on the recording sheet.

FIG. 5 shows an output example where characters "ABCDEFG" and "HIJKLMN" are printed on the recording sheet 106. The printing is performed at a printing density of 360 DPI with the character size of 10 point, i.e., 48 dots (the vertical direction)×32 dots (the horizontal direction). In FIG. 5, printing is not performed at blank portions 501, 503 and 505 but merely the recording sheet 106 is transferred in the subscanning direction by the respective widths (W1, W3 and W5) of the blank portions. Accordingly, no print buffer is used. In this point, the operation of the present embodiment and that in the conventional printing method are the same.

On the other hand, in a case where the characters "ABCDEFG" and "HIJKLMN" are respectively printed in printing areas 502 and 504, these character arrays can be completely printed in one scanning respectively, in consideration of the character size and the number of nozzles of the print head. In a conventional printing according to double-buffer control, as the number of print buffers used in one scan-printing corresponds to the total number of nozzles of the print head, two print-buffer memories each having a memory size of, 128 bits in a subscanning direction and 3 Kbits in a main-scanning direction, are required. However, as the present embodiment allocates print buffers in 8-bit units in the subscanning direction, only 12 print buffers (12×8 bits×3 Kbits) are required even if printing is performed under double-buffer control.

Comparing the necessary buffer capacity between the present embodiment and the conventional print buffer control, the conventional print buffer requires 96 Kbyte capacity, while the present embodiment requires only 36 Kbyte capacity.

Figure 6:
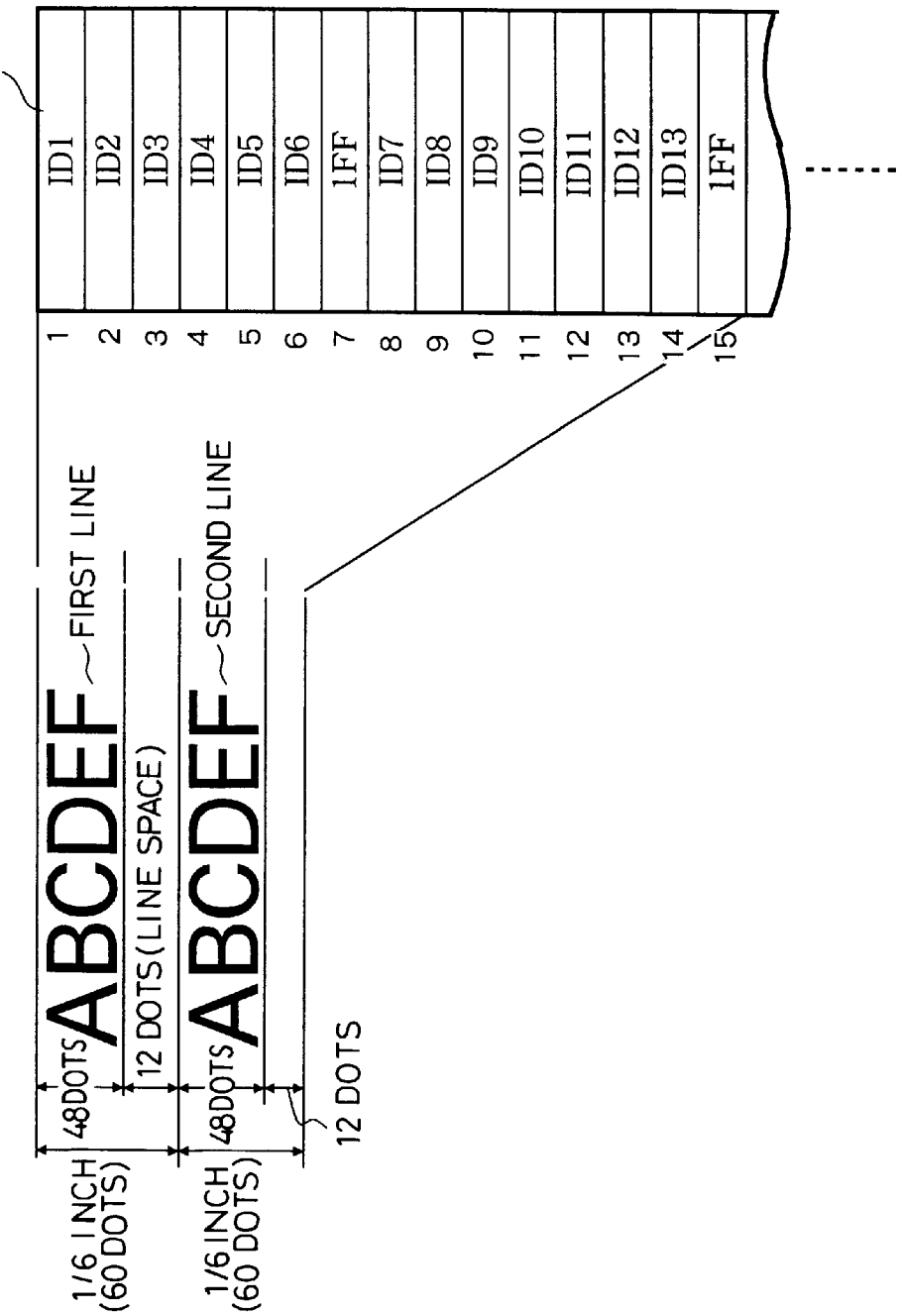
FIG. 6 is an explanatory view of printing according to the first embodiment, where the characters "ABCDEFG" are printed for two lines, in the same character size and at the same printing speed as those in the printing in FIG. 5.

Next, as shown in FIG. 6, printing where the characters "ABCDEFG" are printed for two lines with the same character size and at the same printing density as those in the printing in FIG. 5 will be described. In this case, the line pitch is ⅙ inch (60 dots if the printing density is 360 DPI). Accordingly, line space is 1/30 inch (12 dots).

As shown in FIG. 6, the cells of the print-buffer management table 203 are sequentially used from the first cell (ID1) to print the character arrays, as a result, 15 cells are used for printing two lines. To print the first character array, six print buffers ID1 to ID6 are used, and the print-buffer ID numbers are set in the first to sixth cells of the print-buffer management table 203. There is no print data for the 12-dot line space between the character arrays, therefore, no print buffer is allocated for, at least 8-dot space. Accordingly, the flag 1FF, indicative of no buffer allocation, is set in the seventh cell of the print-buffer management table 203, and print-buffer allocation is not performed.

Then, as 4-bit line space and 4-bit character array portion of the second character array follow, only data corresponding to the 4-bit character array portion is stored in the print buffer ID7. Since the character size is 48 dots in the vertical direction, print data is stored in at least 5 following print buffers ID8 to ID12. Accordingly, the respective print-buffer ID numbers are set in the ninth to thirteenth cells of the print-buffer management table 203. Print data for the remaining 4-dot character portion is stored in a print buffer ID13, but no data is stored for the following 4-dot blank portion. However, since the print buffer is used, a corresponding print-buffer ID number ID13 is set in the fourteenth cell of the print-buffer management table 203.

There is no print data for the remaining 8-dot blank portion, and no print buffer is allocated. Accordingly, the flag 1FF is set in the fifteenth cell of the print-buffer management table 203.

The number of print buffers used in the above printing is thirteen, and the total 39 Kbyte memory area is used. On the other hand, in conventional printing, the number of print buffers corresponding to the number of nozzles of print head is necessary for one-scan printing, and the required total memory capacity is 48 Kbytes.

According to the present embodiment, the capacity of a print buffer as a management unit is reduced and the print buffers are allocated only for areas requiring print data. This enables a print buffer to be efficiently utilized. Thus, this can provide a high-speed printer, even if a printing control method which needs a large memory capacity, such as double-buffer control is employed, with reduced costs, by efficiently using small-capacity memories.

Figure 7:
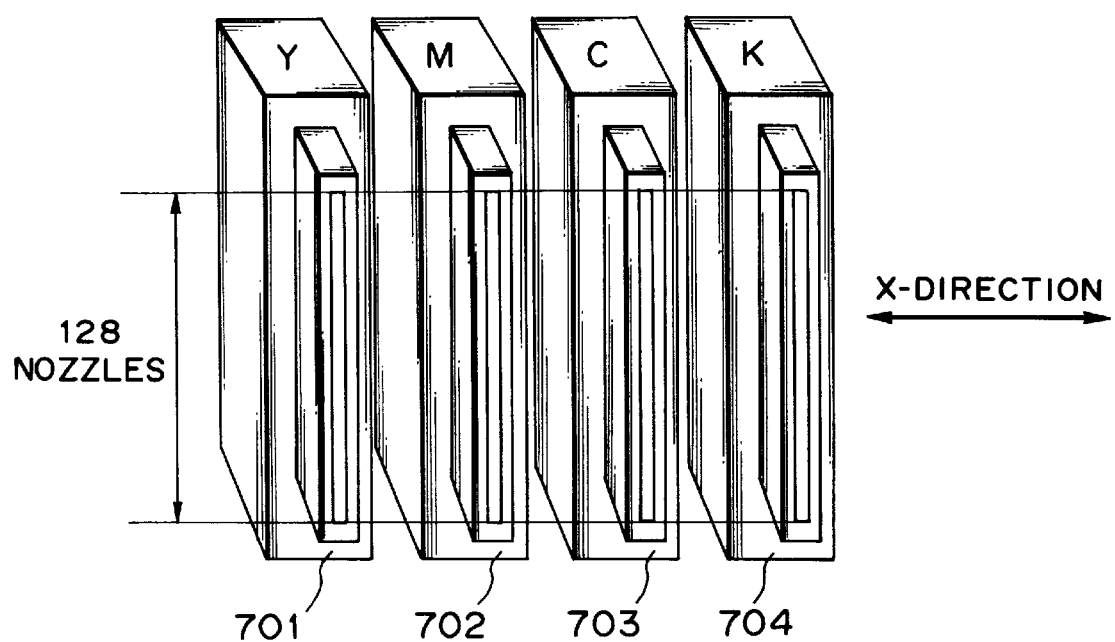
FIG. 7 is a perspective view of a print head 102 capable of color printing according to a second embodiment, viewed from the recording sheet 106 side.
Figure 8:
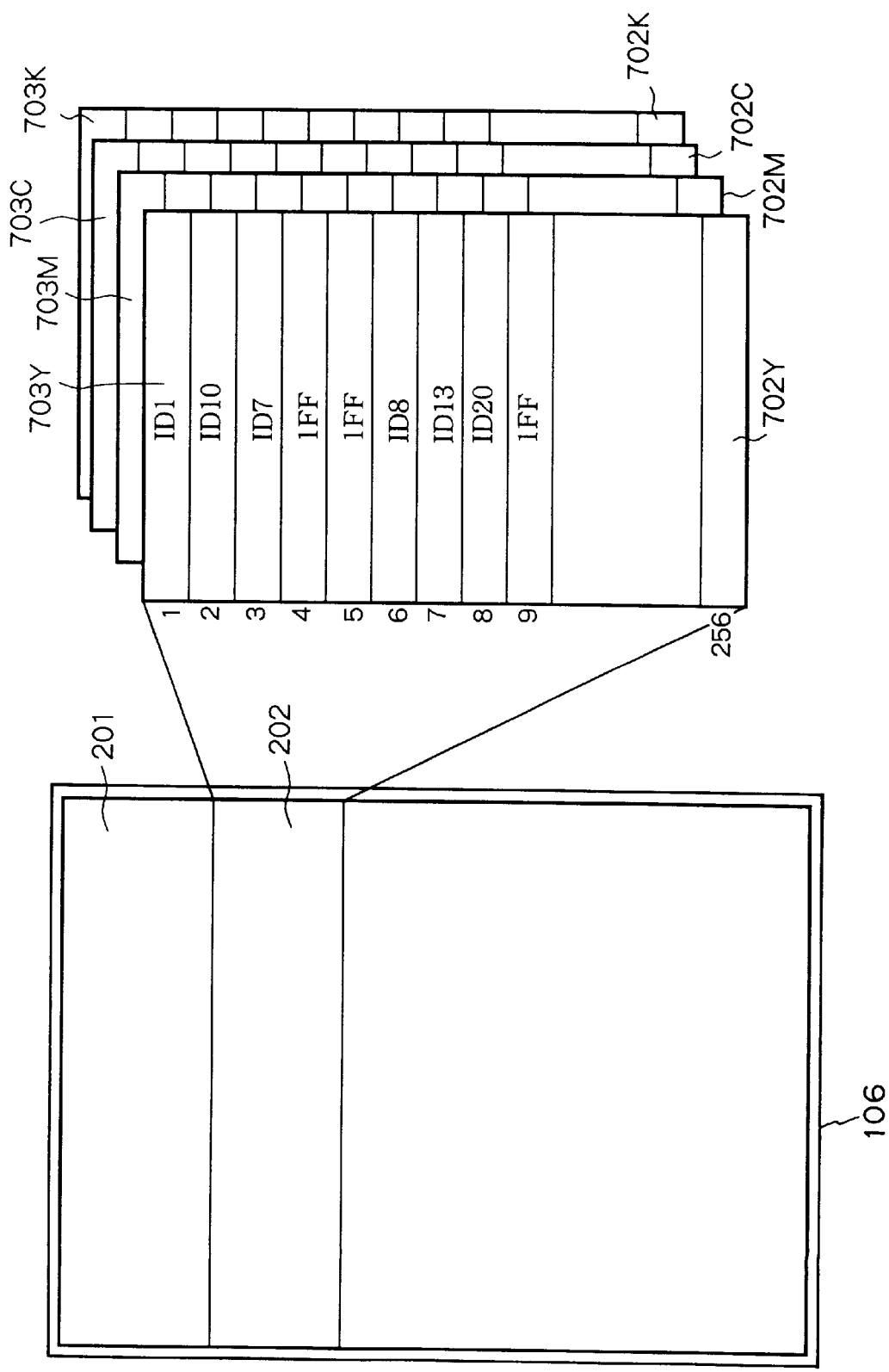
FIG. 8 is an explanatory view showing the relation between the printing area 201 and the scan-print area 202 both on the recording sheet 106, according to the second embodiment.
Figure 9:
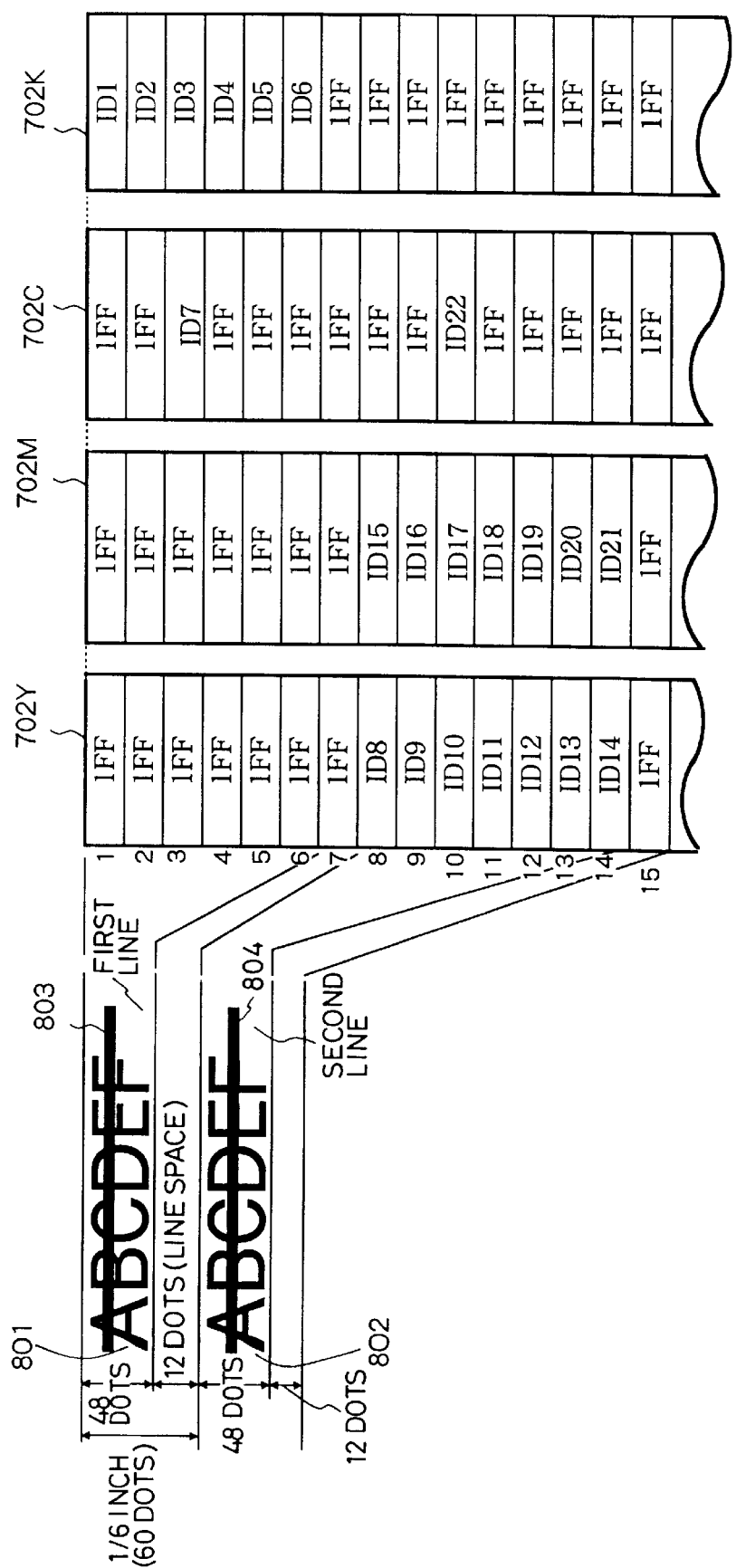
FIG. 9 is an explanatory view of color printing according to the second embodiment, where the characters "ABCDEFG" are printed for two lines.

Second Embodiment (FIGS. 7 to 9)

In this embodiment, the above-described ink-jet printer is capable of color printing, and a case where color images and characters are printed using this printer will be described.

FIG. 7 shows the print head 102 capable of color printing according to the present embodiment viewed from the recording sheet 106 side. In FIG. 7, numeral 701 denotes a head which discharges yellow ink (hereinafter referred to as "Y head"); 702, a head which discharges magenta ink (hereinafter referred to as "M head"); 703, a head which discharges cyan ink (hereinafter referred to as "C head"); and 704, a head which discharges black ink (hereinafter referred to as "K head"). The group of these heads are aligned in the main-scanning direction. The heads discharge ink droplets simultaneously to form color images and characters on a recording sheet. Each head has 128 ink-discharge nozzles.

FIG. 8 shows the relation between the effective printing area 201 of the recording sheet 106 and the scan-print area 202 on which printing is performed by one-scanning of the print head. Similar to the first embodiment, this embodiment also employs a plurality of print buffers for temporarily storing data for printing on recording sheet, however, employs four print-buffer management tables 702Y, 702M, 702C and 702K corresponding to the Y head, the M head, the C head and the K head respectively, for managing the use of the print buffers. The print-buffer management table 702Y has cells 703Y; the print-buffer management table 702M, cells 703M; the print-buffer management table 702C, cells 703C; and the print-buffer management table 702K, cells 703K. In each cell, corresponding to each nozzle, a print buffer ID number (ID$n$) or a flag indicative of a state where no buffer is allocated (1FF) is stored. The ink-jet printer of this embodiment uses 150 print buffers. The print-buffer management tables respectively have 256 cells. The print-buffer management tables are ring-structured for cyclic use.

On the other hand, as each of Y, M, C and K heads head has 128 nozzles aligned in the subscanning direction, the print-buffer management tables 702Y, 702M, 702C and 702K manage print buffers for four scannings of the print head.

In comparison with the first embodiment, the manner of management of the print-buffer management tables is similar to the print-buffer management table of the first embodiment, and only the difference is that the four print-buffer management tables 702Y, 702M, 702C and 702K are independently provided corresponding to the respective Y, M, C and Y heads.

Next, the capacity of print buffers necessary for color-printing the array of characters "ABCDEF" for two lines will be described with reference to FIG. 9. In FIG. 9, numeral 801 denotes a black character array "ABCDEF"; 802, a red character array "ABCDEF", and 803 and 804, cyan lines. The printing density of character-output is 360 DPI, and the character size is 10 point, i.e., the printing is made by 48 dots×32 dots and line pitch is ⅙ inch (60 dots when the printing density is 360 DPI), accordingly, the line space is ⅟₃₀ inch (12 dots).

As shown in FIG. 9, assuming that the print-buffer management tables 702Y, 702M, 702C and 702K are used from the first cell, and the print buffers are sequentially used from a buffer ID1 in printing of the above character array, the 15 cells of each print-buffer management table are used in printing for two lines. As shown in FIG. 9, to print out the character arrays and lines in color according to the above condition, the ID numbers of the used print buffers are set in each corresponding cell of the print-buffer management tables 702Y, 702M, 702C and 702K.

That is, print-buffer ID numbers ID1 to ID6 are set in the first to sixth cells of the print-buffer management table 702K, for printing the black character array "ABCDEF" 801 in the first line; a print buffer ID number ID7 is set in the third cell of the print-buffer management table 702C, for printing the cyan line 803; print buffer ID numbers ID8 to ID21 are set in the eighth to fourteenth cells of the print-buffer management tables 702Y and 702M, for printing the red character array "ABCDEF" 802 in the second line; and a print buffer ID number ID22 is set in the tenth cell of the print-buffer management table 702C, for printing the cyan line 804. The flag 1FF is allocated in the table cells other than the above cells.

In printing on conditions given as above, print buffer ID numbers are set in only the necessary cells of a print-buffer management table of necessary color component. The printing operation shown in FIG. 9 requires 22 print buffers, i.e., 66 Kbyte buffer memory capacity.

If the above printing is made according to the conventional method, the necessary buffer memory capacity is 192

Kbytes ((4(number of heads)×128 (number of nozzles))/8 (width in subscanning direction per one print buffer)×3 K(capacity of one print buffer)), corresponding to all the nozzles of the four heads.

According to the present embodiment, the printbuffer allocation is controlled such that the print buffer capacity as a unit for management is reduced and the print buffers are allocated only for printing area which requires print data. Thus, the print buffers are efficiently used and a large amount of memory capacity necessary for printing operation is saved. In other words, if the present embodiment and the conventional method respectively handle printing with the same memory capacity, the present embodiment can manage a greater number of printing lines than that in the conventional method.

Third Embodiment (FIGS. 10 to 23)

In this embodiment, the ink-jet printer is capable of color printing. However, the printer of this embodiment uses a print head different from that of the second embodiment. Printing where color images and characters are printed on the recording sheet 106 by this printer will be described.

FIG. 10A shows the print head 102 according to the present embodiment, capable of color printing, viewed from the recording sheet 106 side. FIG. 10B shows the print head 102 from the rear side. As shown in FIG. 10A, the print head 102 has yellow (Y), magenta (M), cyan (C) and black (K) ink-discharging nozzles aligned in the subscanning direction. To discharge each of yellow, magenta, cyan and black inks, the print head 102 uses 8 nozzles for each color. These 8-nozzle groups are referred to as nozzle groups 1209 to 1212. The nozzle groups for the respective colors are arranged with an interval longer than a nozzle pitch. Each nozzle in each group is commonly connected to an ink channel, and an ink cartridge for supplying a predetermined color of ink to the ink channel is attached to the end portion of the ink channel.

An electrothermal transducer for generating thermal energy is provided at each ink channels corresponding to the respective nozzles, and electrode wiring for supplying electricity to the electrothermal transducer is also provided there. These elements are formed by film formation process on a base plate 1201 made of silicon or the like. Further, a partition walls and a top plate and so on are accumulatively formed on the base plate 1201, thus constructing the nozzles, the ink channels and a common liquid chamber. In addition, a driver for driving the electrothermal transducer based on a print signal is provided, on a print circuit board 1202, at the rear side of the base plate 1201.

The base plate 1201 and the print circuit board 1202 are both fixed onto an aluminum plate 1203. The ink cartridges 110 and 111 are inserted into the cartridge guide 103 along the aluminum plate 1203, and connected to pipes 1204 to 1207 projecting along the aluminum plate 1203. The pipe 1204 receives yellow ink; the pipe 1205, magenta ink; the pipe 1206, cyan ink; and 1207, black ink. The pipes 1204 to 1207, respectively connected to a corresponding common liquid chamber of discharge orifice group (yellow, magenta, cyan and black) through liquid channels within a plastic member 1208 (also referred to as "distributor") elongated in a direction orthogonal to the base plate 1201, project from the plastic member 1208.

Figure 11:
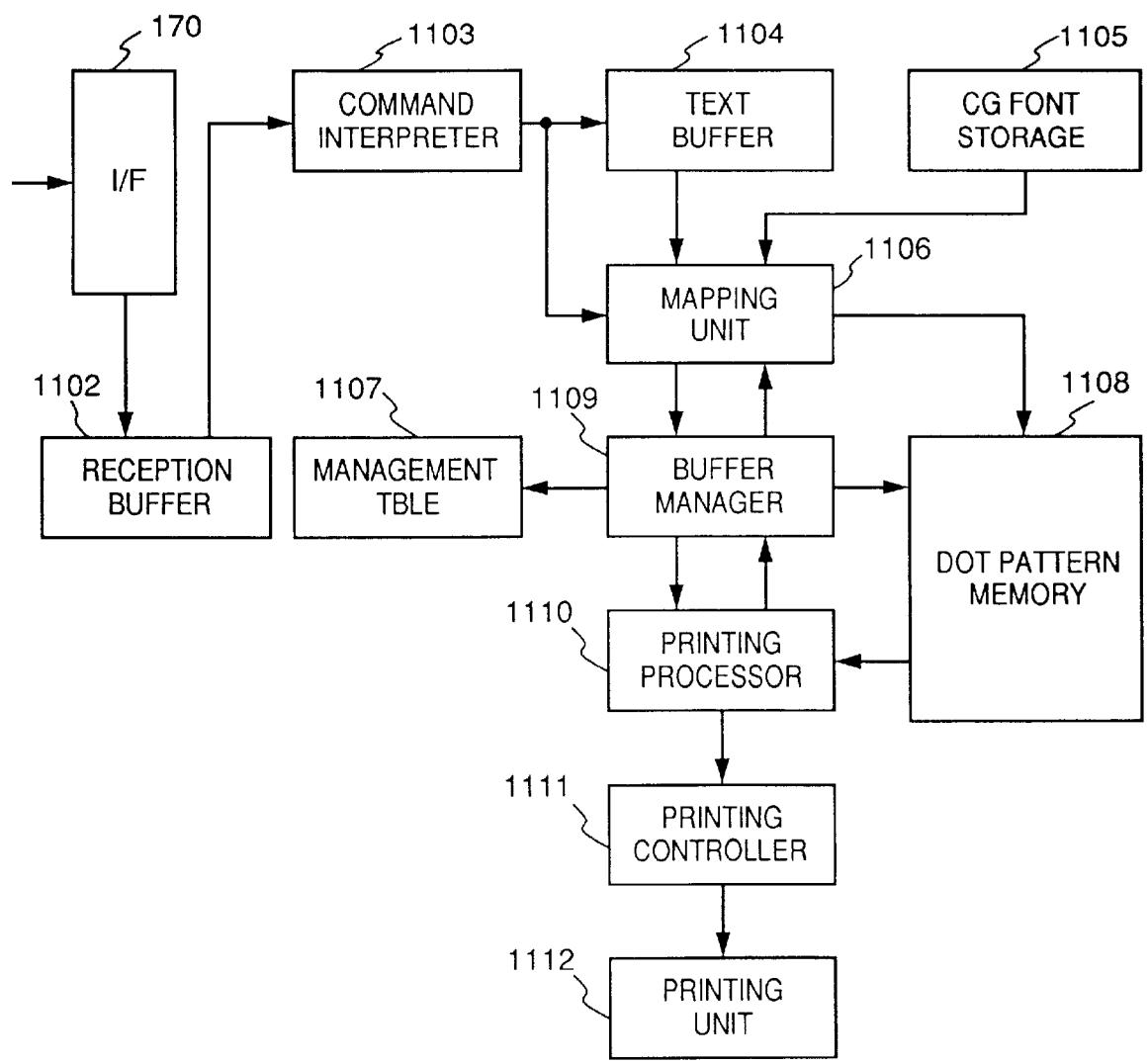
FIG. 11 is a block diagram showing the functional construction of the controller according to the third embodiment.
Figure 12A:
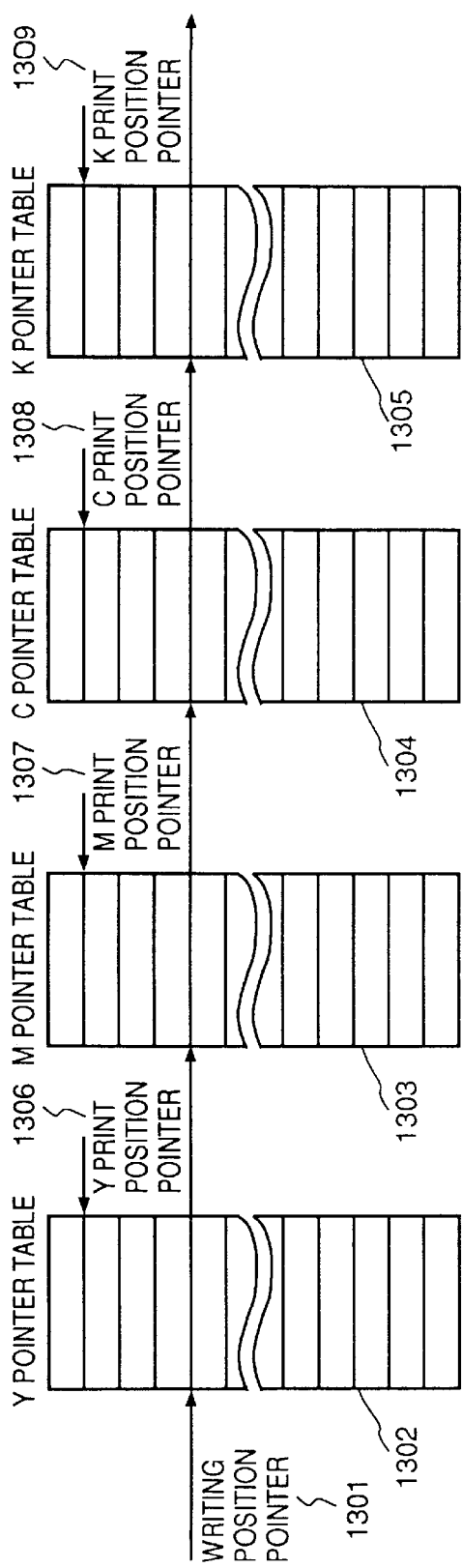
FIG. 12A is a block diagram showing the logical structure of a management table 1107 according to the third embodiment.
Figure 12B:
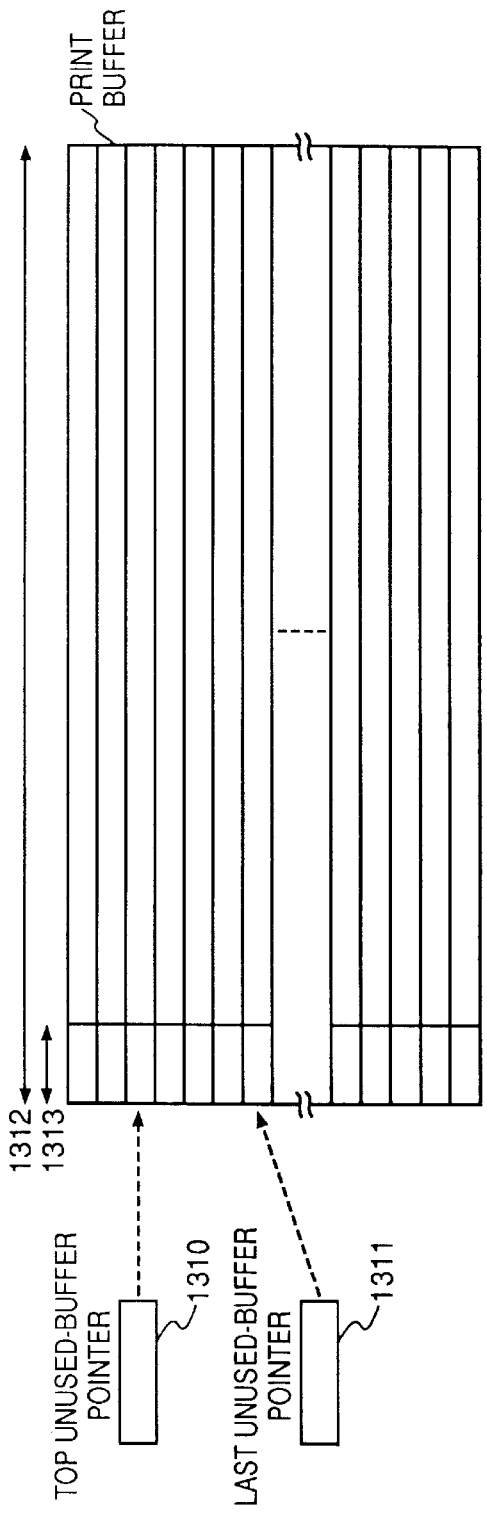
FIG. 12B is a block diagram showing the logical structure of print buffers according to the third embodiment.

FIG. 11 shows the functional construction of the controller according to the present embodiment. In FIG. 11, numeral 1102 denotes a reception buffer, to which a predetermined area of the gate array 174 is allocated, for storing data received via the interface 170 from the host computer. Also, a predetermined area of the ROM 172 is allocated to a CG font storage 1105 for storing character font for mapping a character code into a character pattern. Further, predetermined areas of the DRAM 173 are allocated to a text buffer 1104, a management table 1107 and a dot pattern memory 1108. A printing unit 1112 is constructed with the elements shown in FIG. 1 and the drivers 175 to 177, the print head 102, and the motors 178 to 179 shown in FIG. 2.

In FIG. 11, elements other than the above-described elements function in accordance with control programs executed by the MPU 171 using the work area of the DRAM 173. That is, a command interpreter 1103 interprets control codes, character codes, dot patterns and the like sent from the host computer. In case of character pattern, the command interpreter 1103 stores it in the text buffer 1104 in the form of text information, and in case of dot pattern, directly forwards the data to a mapping unit 1106. The mapping unit 1106 refers to the text information in the text buffer 1104 and the CG font in the CG font storage 1105, maps the received data into a character pattern to be used for printing, and writes this character pattern or the dot pattern from the command interpreter 103, into the dot pattern memory 1108, based on the instruction from the buffer manager 1109. The management table 1107 is accessed by the buffer manager 1109 for controlling the dot pattern memory 1108. The dot pattern memory 1108 is used as a print buffer for storing the character pattern mapped by the mapping unit 1106 and the dot pattern also from the mapping unit 1106. Though described in detail later, the memory area of the dot pattern memory 1108 is divided into small areas as a plurality of print buffers.

The buffer manager 1109 receives a buffer-acquisition requirement from the mapping unit 1106, refers to the management table 1107 to allocate an unused area of the dot pattern memory 1108 as a print buffer, or receives a buffer-return requirement from the print processor 1110, writes necessary information into the management table 1107 to change a used print buffer into an unused area again, thus updates the management table 1107. The print processor 1110 monitors whether or not a print buffer which has been already used for printing exists, and if there is an available print-buffer area, performs processing to allocate the print buffer to the print controller 1111. The print controller 1111 controls printing operation of the printing unit 1112 which actually performs printing on a printing medium such as a recording sheet.

FIGS. 12A and 12B, 14A and 14B, 16A and 16B, 18A and 18B, 20A and 20B and 22A and 22B shows the logical structure of the management table 1107 and the print buffers of the dot pattern memory 1108 controlled by the buffer manager 1109. The figures show the relation between data set in the management table 1107 and data set in the print buffers, and the relation between mapping positions in the print buffers, indicative of positions of mapping by the mapping unit 1106, and print positions in the print buffers, accessed by the printing unit 1112 upon performing printing on a recording medium. FIGS. 12A, 14A, 16A, 18A, 20A and 22A show the logical structure of the management table 1107, and FIGS. 12B, 14B, 16B, 18B, 20B and 22B show the logical structure of the print buffers.

As shown in FIGS. 12A, 14A, 16A, 18A, 20A and 22A, the management table 1107 comprises a Y pointer table 1302, a M pointer table 1303, a C pointer table 1304 and a K pointer table 1305. The Y pointer table 1302 is a ring-structured table for storing print buffer ID's of print buffers in which Y (yellow) data is written. Similarly, the M pointer table 1303 is a table for storing print buffer ID's of print buffers in which M (magenta) data is written; the C pointer table 1304, a table for storing print buffer ID's of print buffers in which C (cyan) data is written; and the K pointer table 1305, a table for storing print buffer ID's of print buffers in which K (black) data is written.

Numeral 1301 denotes a writing position pointer indicative of a position where data common to the Y pointer table 1302, the M pointer table 1303, the C pointer table 1304 and the K pointer table 1305 is written. Numeral 1306 denotes a Y print position pointer indicative of a print-start position at which outputting of Y (yellow) component data stored in the pointed print buffer to the print head 102 is started; 1307, a M print position pointer indicative of a print-start position at which outputting of M (magenta) component data stored the pointed print buffer to the print head 102 is started; 1308, a C print position pointer indicative of a print-start position at which outputting of C (cyan) component data stored in the pointed print buffer to the print head 102 is started; and 1039, a K print position pointer indicative of a print-start position at which outputting of K (black) component data stored in the pointed print buffer to the print head 102 is started.

On the other hand, in FIGS. 12B, 14B, 16B, 18B, 20B and 22B, numeral 1310 denotes a top unused-buffer pointer for managing use of print buffers, in which information of a buffer position (ID) of a top buffer of unused print buffers is stored. Numeral 1313 denotes a buffer ID storage area using the first 1 byte of the print buffers for storing a buffer position (ID) of the unused buffer to be used next. Numeral 1311 denotes a last unused-buffer pointer also for managing use of print buffers, in which information of a buffer position (ID) of a last buffer of unused print buffers is stored. Numeral 1312 represents the printing width of a printing range by the print head 102 in the main-scanning direction.

Figure 13A:
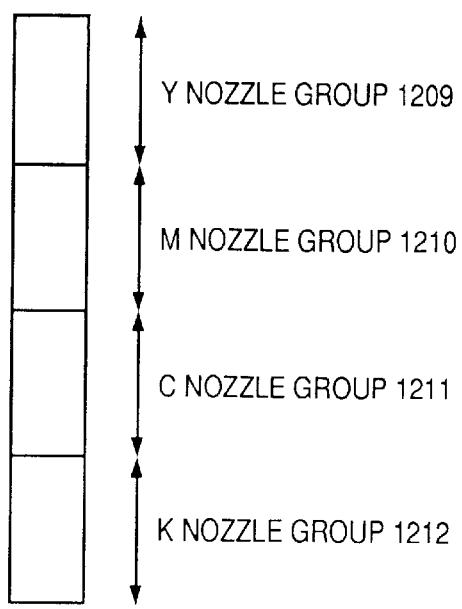
FIGS. 13A and 13B are explanatory views showing relative movement of nozzle groups 1209 to 1212 of the print head 102, according to the third embodiment.
Figure 13B:
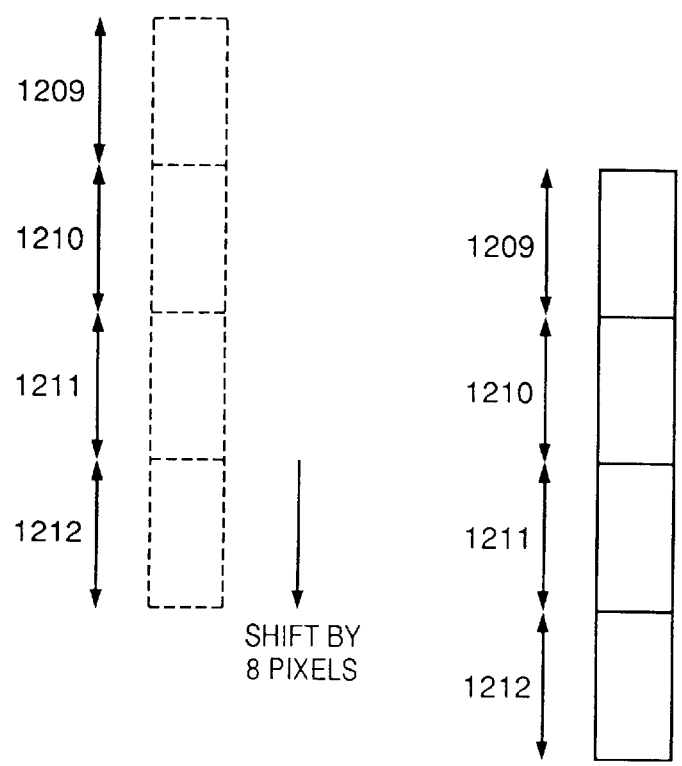

FIG. 13A is shows only the nozzle groups 1209 to 1212 of the print head 102. The nozzle group 1209 has eight Y nozzles; the nozzle group 1210, eight M nozzles; the nozzle group 1211, eight C nozzles; and the nozzle group 1212, eight K nozzles. The print head having this construction operates as follows. First, printing in a print area corresponding to eight pixels in the subscanning direction is made with the K nozzle group 1212. Then, as shown in FIG. 13B, the recording sheet is shifted by an amount corresponding to eight pixels in the subscanning direction, and printing in the same print area is made with the C nozzle group 1211. Further, the recording sheet is shifted by the amount corresponding to eight pixels in the subscanning direction, and printing in the same print area is made with the M nozzle group 1210. Finally, the recording sheet is shifted by the amount corresponding to eight pixels in the subscanning direction, and printing in the same print area is made with the Y nozzle group 1209. In this manner, color printing is made by shifting the recording sheet by the amount corresponding to eight pixels in the subscanning direction four times, and by sequentially scanning the respective nozzle groups four times in the same printing area.

Next, allocation of the print buffers having the above construction using the management table having the above constructions will be described below.

Figure 14A:
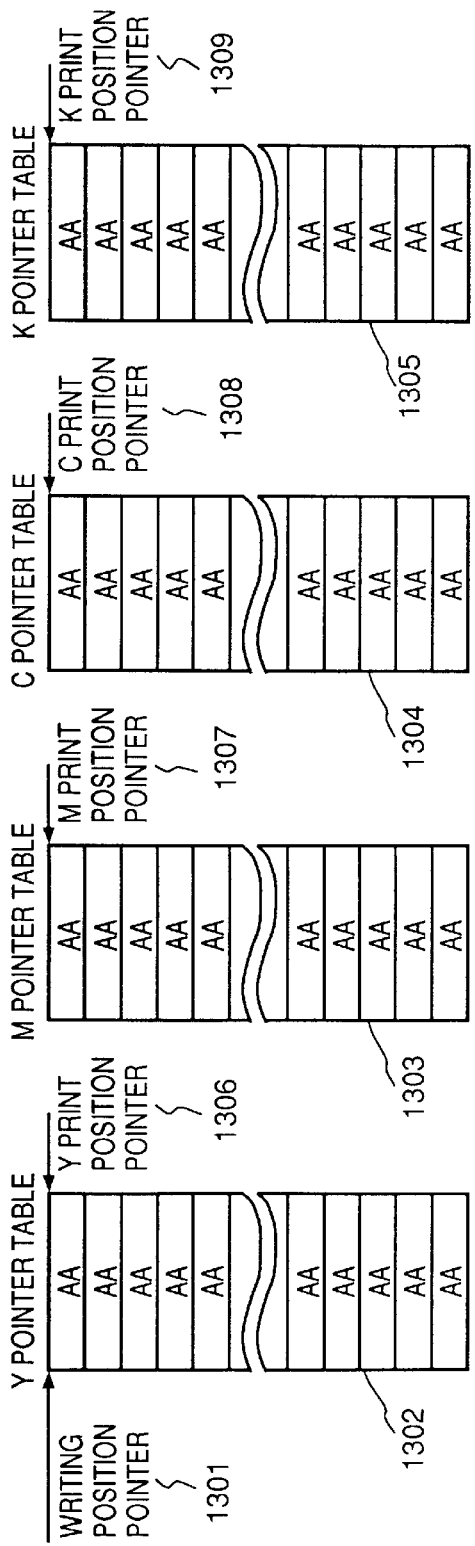
FIG. 14A is a block diagram showing the logical structure of a management table 1107 according to the third embodiment.
Figure 14B:
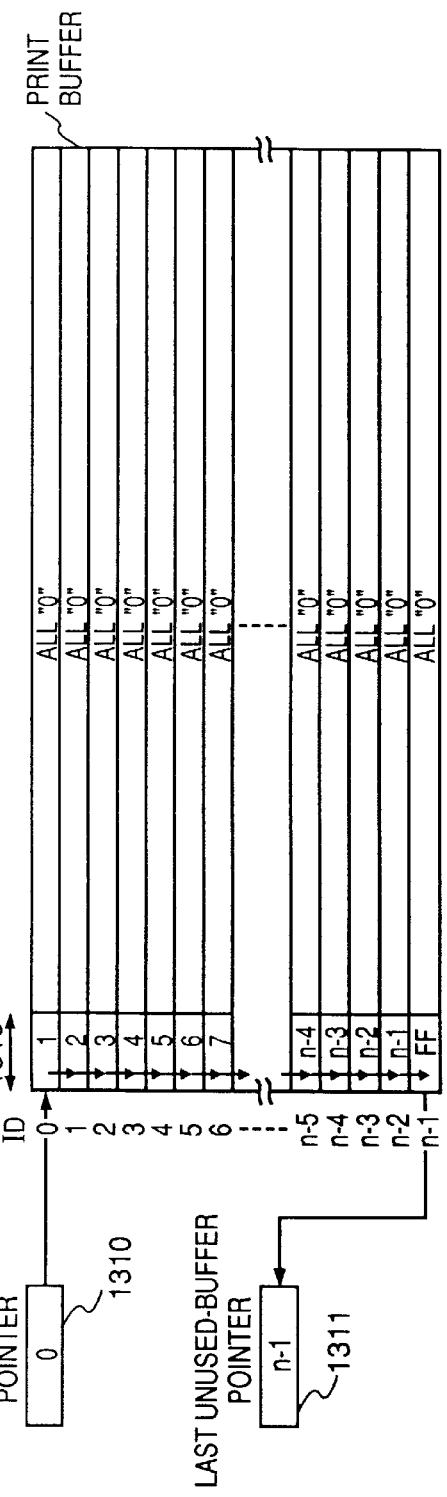
FIG. 14B is a block diagram showing the logical structure of print buffers according to the third embodiment.

FIGS. 14A and 14B show the print buffers and the management tables upon initialization processing.

When the system is initialized in, e.g., turning the power of the apparatus on, the MPU 171 executes an initialization processing as shown in FIG. 23A, to initialize the tables and print buffers. In step S11, the writing position pointer 1301 and the Y, M, C, K print position pointers 1306 to 1309 are initialized, as a result, the writing position pointer 1301 points the top print position of each pointer table, the Y print position pointer 1306, the M print position pointer 1307, the C print position pointer 1307, the C print position pointer 1308 and the K print position pointer 1309 respectively point a print-start position of the Y pointer table 1302, a print-start position of the M pointer table 1303, a print-start position of the C pointer table 1304, a print-start position of the K pointer table 1305.

Next, in step S12, the pointer tables 1302 to 1305 are initialized. As shown in FIG. 14A, a value not to be used as a buffer ID (e.g., "AA") is set in the buffer ID storage areas of the Y pointer table 1302, the M pointer table 1303, the C pointer table 1304 and the K pointer table 1305. Thus, the tables have status where no print buffer is allocated.

In step S13, chaining processing where unused buffers are chained is performed. As shown in FIG. 14B, all the print buffers values are cleared to "0" as unused status. Next, the ID number of the 0th buffer being the top of the print buffers, "ID0" is stored in the top print buffer pointer 1310. Further, in each print buffer, the next buffer ID is stored into the buffer ID storage area 1313, to chain the buffer ID's of the next unused print buffer. As the last print buffer, a value not to be used as a buffer ID (e.g., "FF") is stored in the buffer ID storage area 1313 of the last buffer, and the ID number (n-1) of the last buffer is stored in the last unused-buffer pointer 1311.

Figure 15:
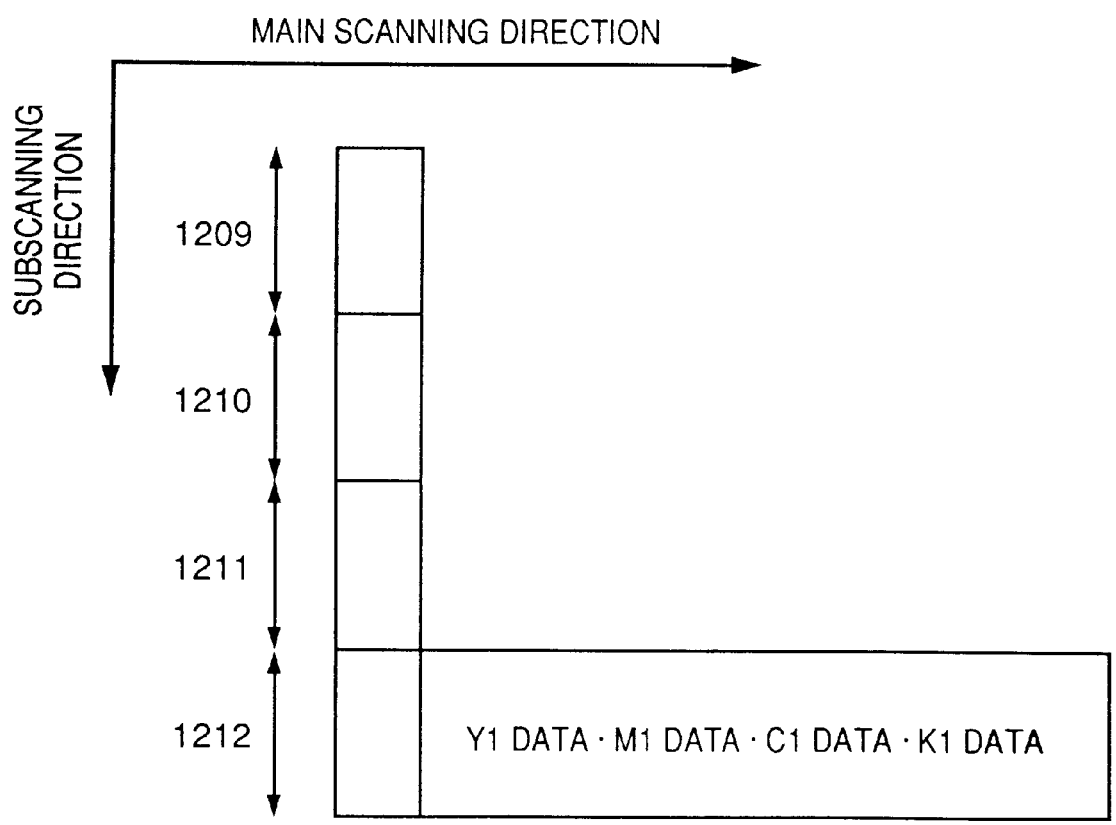
FIG. 15 is an explanatory view showing printing based on print data transferred from a host computer to the nozzle group 1212 of the print head 102, according to the third embodiment.

Next, a case where printing is performed in a printing area with the K nozzle group 1212 as shown in FIG. 15, using print data sent from the host computer will be described. In this example, K component data is referred to as K1 print data; Y component data, Y1 print data; M component data, M1 print data; and C component data, C1 print data. In case of the print head having the construction as shown in FIG. 13, the respective color component data are sent from the host computer, with the position of the K nozzle group 1212 as a reference position. At this time, the mapping unit 1106 issues a buffer-acquisition requirement to the buffer manager 1109 for mapping the received data in the print buffers of the dot pattern memory 1108.

FIGS. 16A and 16B show the management table 1107 and the print buffers upon storing the respective Y (yellow), M (magenta), C (cyan) and K (black) component data into the print buffers, based on the print data sent from the host computer after the initialization.

In this example, the MPU 171 executes buffer-acquisition processing as shown in FIG. 23B, in accordance with the buffer-acquisition requirement from the mapping unit 106, to update the respective pointer tables and to release the print buffers from the chain. In step S21, the top unused print buffer is updated and buffer allocation is performed based on the number of designated colors and the number of required buffers. That is, as shown in FIG. 16B, the buffer ID stored in the top unused-buffer pointer 1310 is examined, then the buffer ID storage area 1313 is referred to from the top unused buffer, and the print buffers of a designated number are released from the buffer chain. The buffer ID of the next buffer, stored in the buffer ID storage area 1313 of the last one of the released buffers, is stored into the top unused-buffer pointer 1310. This updates the buffer ID of the top buffer of the unused buffer chain. In FIG. 16B, an buffer ID "4", stored in the buffer ID storage area of the third buffer, is stored into the top unused-buffer pointer 1310.

In step S22, the buffer ID stored in the buffer ID storage area 1313 is cleared. That is, to use the buffers released from the chain for storing print data, the buffer ID's in the buffer ID storage areas 1313 of those unchained buffers are cleared to "0".

In step S23, the ID's of the allocated buffers are stored into the pointer tables 1302 to 1305. Specifically, the buffer ID's of the allocated buffers of the required number are stored into each pointer table. For example, as shown in FIG. 16A, in a case where the 0th buffer is allocated to Y (yellow) data, a buffer ID "0" of the allocated buffer is stored in the Y pointer table 1302 at a position indicated by the writing position pointer 1301. Similarly, in a case where the first buffer is allocated to M (magenta) data, a buffer ID "1" of the allocated buffer is stored in the M pointer table 1303 at a position indicated by the writing position pointer 1301. In a case where the second buffer is allocated to C (cyan) data, a buffer ID "2" of the allocated buffer is stored in the C pointer table 1304 at a position indicated by the writing position pointer 1301. In a case where the third buffer is allocated to K (black) data, a buffer ID "3" of the allocated buffer is stored in the K pointer table 1305 at a position indicated by the writing position pointer 1301.

In this manner, the management table 1107 is updated and the print buffers are allocated, thereafter, the mapping unit 1106 refers to the respective pointer tables and maps character patterns in the print buffers, then as shown in FIG. 16A, updates the writing position pointers.

Figure 17:
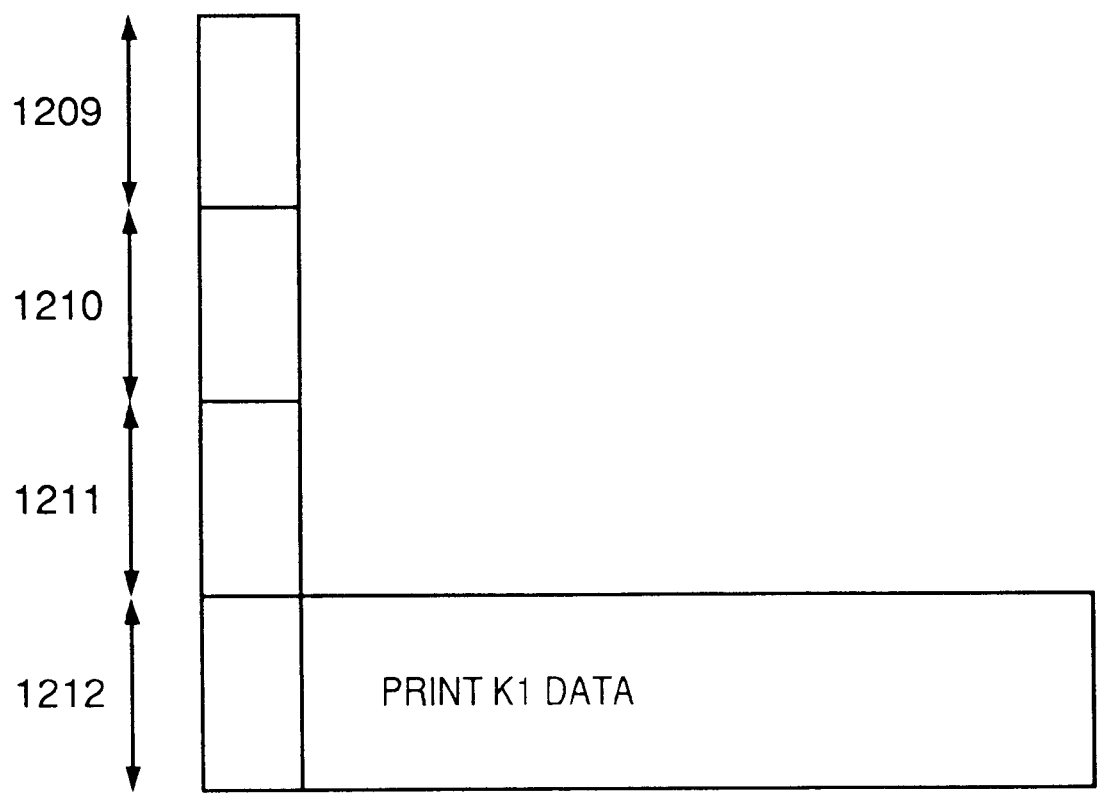
FIG. 17 is an explanatory view showing printing based on only K (black) component data transferred from a host computer to the nozzle group 1212 of the print head 102 according to the third embodiment.

Regarding respective color component data in the same one line, if the values of all the pixel data are "0", the mapping unit 1106 does not acquire any print buffers. Otherwise, if only K data is received, as shown in FIG. 17, the mapping unit 1106 does not acquire print buffers for the other color component data. In the latter case, the table cells of the pointer tables of the other color component data maintain an ID number "AA" which indicates that no print buffer is allocated. The print processor 1110 refers to the buffer ID numbers from the positions indicated by the Y, M, C and K print position pointers 1306 to 1309, and reads the data stored in the corresponding print buffers. If the ID number "AA" indicating that no buffer is allocated is stored in a table cell, since there is no data to be used for ink-discharging by the nozzles of corresponding color, "0" data is automatically used, thus, printing is not performed in the corresponding position.

In a case where a plurality of color component data have the same value, the number of buffers required is made one, and actually the data are written into one print buffer. At this time, an ID number of the buffer is written into the respective pointer tables 1302 to 1305. In this case, the one print buffer is allocated to the plurality of nozzle groups so as to perform the same printing. Thus, if print data is not to be used for printing or the values of respective color component data are the same, allocation of excessive print buffers is omitted. This improves efficiency of use of print buffers.

Next, buffer return processing will be described. In a case where printing operation has continued and there is no available print buffer, buffers already used for printing are initialized to be available buffers.

FIG. 18 shows the management table 1107 and the print buffers after the printing has continued.

In this example, the MPU 171 performs the buffer return processing as shown in FIG. 23C in accordance with a buffer return requirement from the print processor 1110, in which already-used print buffers are initialized (returned) and chained again as unused print buffers, and the respective pointer tables are updated. First, in step S31, values in the already-used buffers are cleared. More specifically, values stored in the already-used buffers are cleared corresponding to ID numbers at positions indicated by the print position pointer, in accordance with the designated color and the number of already-used buffers to be returned. For example, if the status of the K pointer table 1305 is as shown in FIG. 16A, the print buffer corresponding to the ID number "3" indicated by the K print position pointer 1309 is cleared. Then, the status of the K pointer table 1305 becomes as shown in FIG. 18A.

In step S32, the buffer chain is updated. That is, an ID number of the buffer to be returned is stored into the last unused-buffer pointer 1311, and an ID number indicative of the last unused buffer (e.g., "FF") is stored into the buffer ID storage area 1313. For example, if the status of the last unused-buffer pointer 1311 (n-1) is as shown in FIG. 16B, this value is cleared, and the ID number "3" of the print buffer to be returned is stored into the last unused-buffer pointer 1311, then a last buffer ID "FF" is stored into the buffer ID storage area 1313 of the buffer to be returned.

Further, in step S33, ID numbers of the unused buffers are stored in the pointer tables. That is, the ID numbers stored at positions indicated by the print position pointers of the pointer tables of the designated colors are replaced with an ID indicative of an unused buffer (e.g., "AA"). For example, as shown in FIG. 18A, in the K pointer table 1305, the ID number "3" in FIG. 16A is replaced with the unused buffer ID "AA".

Finally, in step S34, the print positions are updated. Since the "returned" print buffers are treated as "already used", the print position pointer is moved to a position where the next print buffer ID number is stored. For example, the K print position pointer 1309 indicating the top cell of the K pointer table 1305 in FIG. 16A is moved to indicate the next cell containing the next buffer ID in FIG. 18A.

FIG. 19 shows the relation between transmission timing of each color component data transmitted from the host computer and the position of the print head. Assuming that the position of the print head 102 as shown in FIG. 15 is a print-start position, as K component data (K1 print data in FIG. 15) has been used in printing by the K nozzles 1212 on the recording sheet, the recording sheet is shifted in the subscanning direction by an amount corresponding to eight nozzles. The range in which printing is performed by this one scanning by eight nozzles is referred to as a path. The path corresponding to the initial scan-printing is a first path. At this time, the next image data for eight pixels (eight nozzles) (Y2 print data, M2 print data, C2 print data and K2 print data in FIG. 19) are transmitted as the next path (second path) data.

FIGS. 20A and 20B showing the management table 1107 and the print buffers after print data for the second path has been received and print-buffer acquisition processing has been performed. As it is apparent from these figures, the image data for the second path are transmitted after the K component data is used in printing of the first path. Accordingly, the print buffer corresponding to the ID number "3" has been cleared, the value of the K pointer table 1305 has been updated, and the K print position pointer 1309 has been moved to the next position (FIG. 20A) when the image data for the second path area transmitted. Also, the value in the top unused-buffer pointer 1310 and that in the last unused-buffer pointer 1311 have been updated (FIG. 20B). In this example, the value of the print buffer corresponding to the ID number "3" is cleared, therefore, the buffer is the last unused buffer.

Figure 21A:
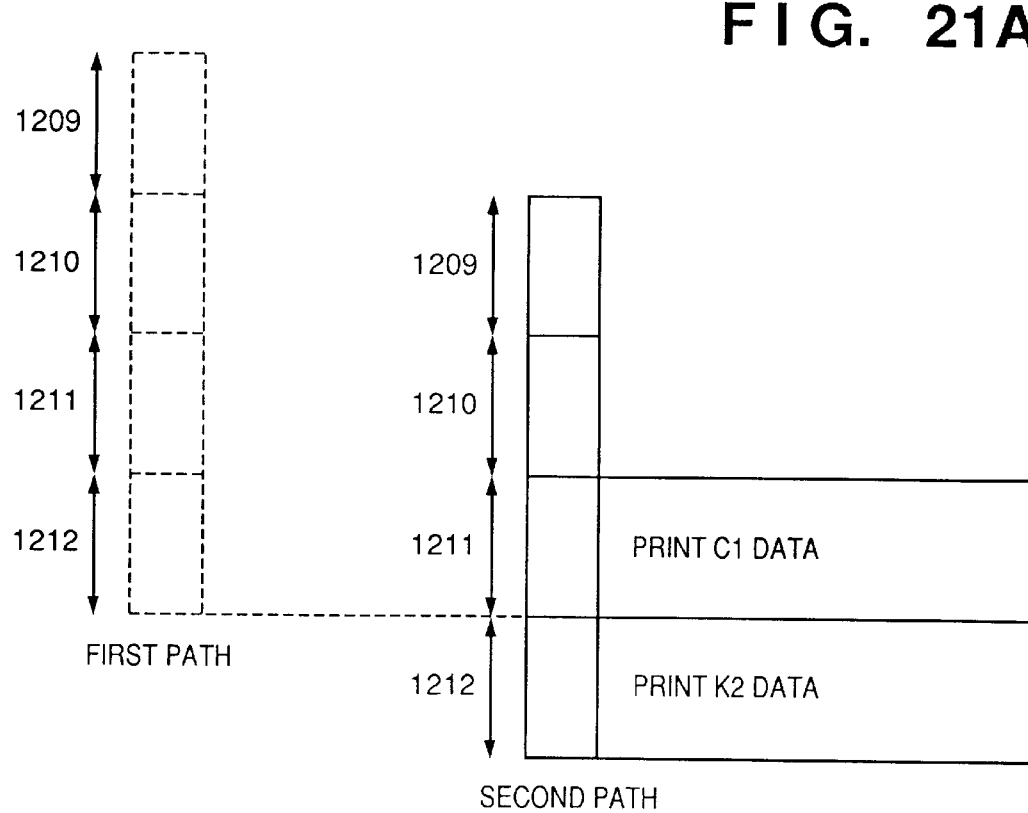
FIG. 21A is an explanatory view showing printing operation of nozzle groups 1211 to 1212 of the print head 102 for first to second paths.

When the image data for the second path has been received, the print head 102 performs printing in the first path area using the C nozzle group 1211 based on the C1 data, at the same time, performs printing in the second path area using the K nozzle group 1212 based on the K2 data. FIG. 21A shows the relation between printing in the first and second path areas and used print data.

Figure 21B:
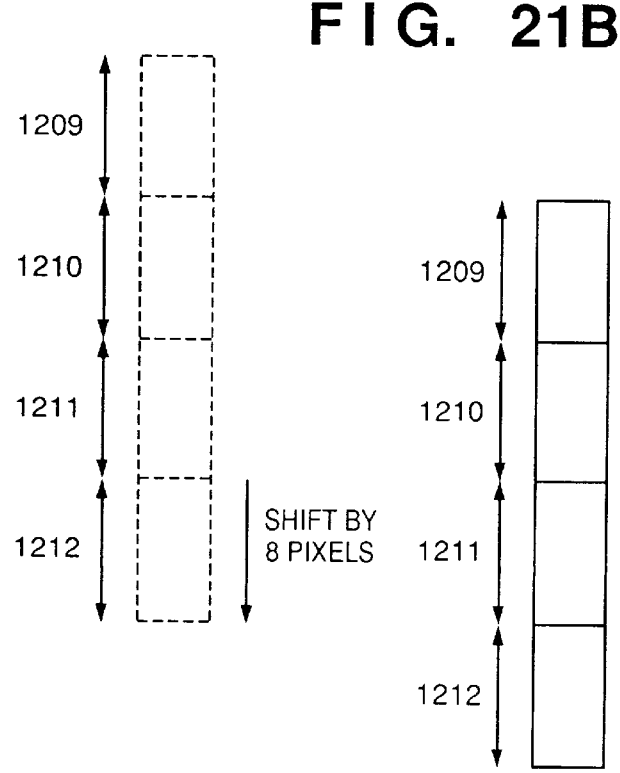
FIG. 21B is an explanatory view showing control of recording-sheet transfer after the printing for the first to second paths, according to the third embodiment.

When the printing in the first and second paths is completed, the recording sheet is transferred in the subscanning direction by the amount corresponding to eight nozzles. At this time, the next image data for eight pixels (eight nozzles) are received as the next path (third path) data. FIG. 21B shows the position of the print head 102 at this time.

Figure 22A:
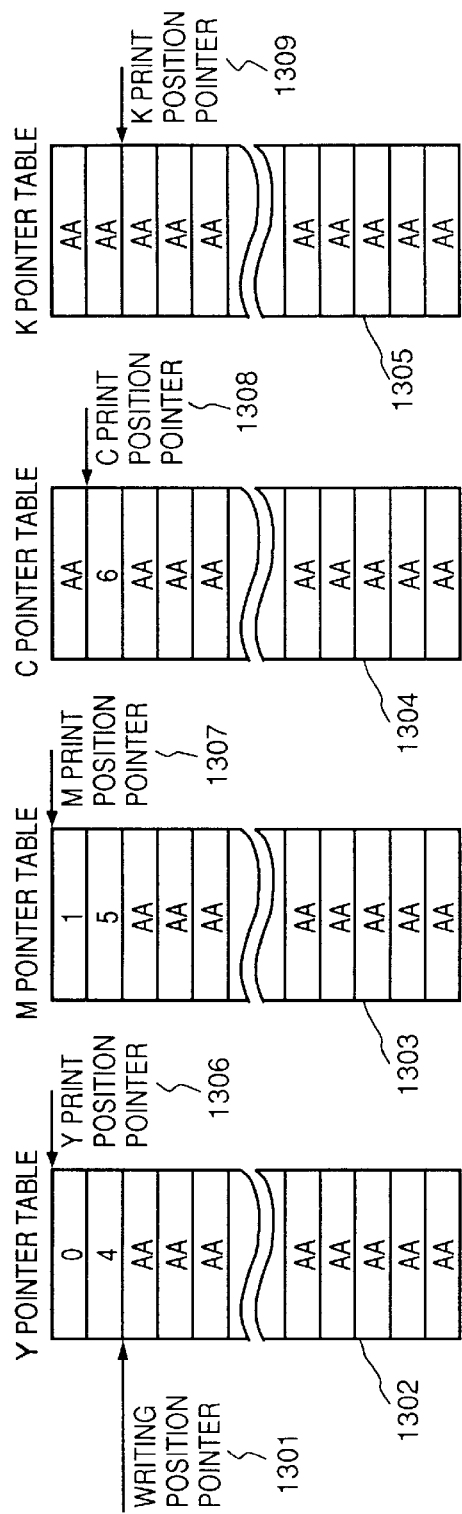
FIG. 22A is a block diagram showing the logical structure of a management table 1107 according to the third embodiment.
Figure 22B:
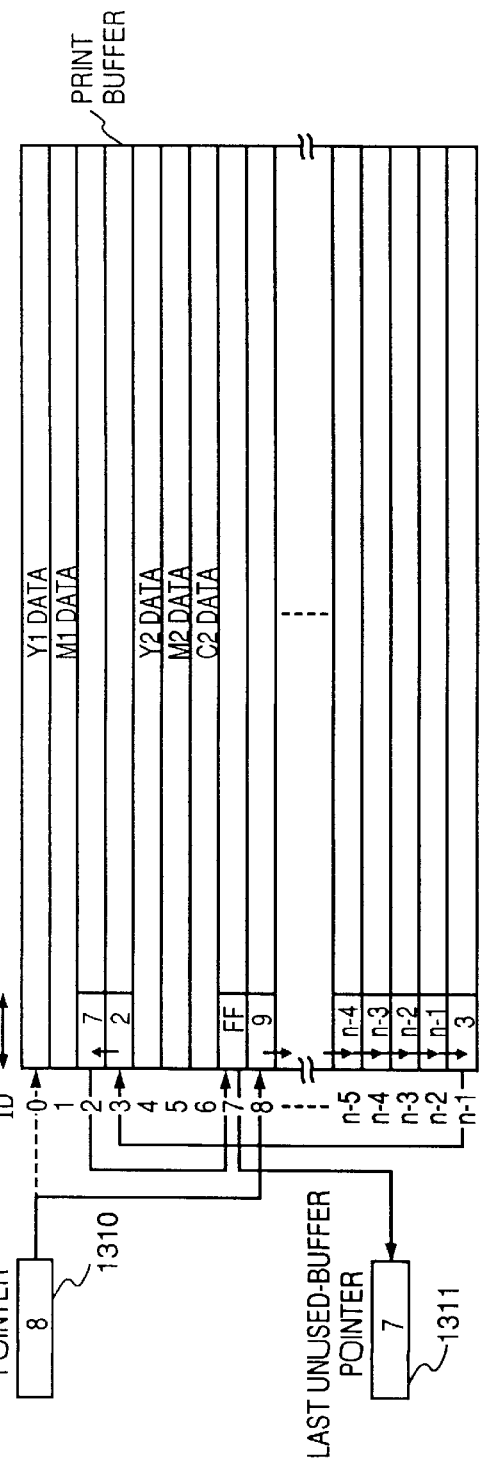
FIG. 22B is a block diagram showing the logical structure of print buffers according to the third embodiment.

FIGS. 22A and 22B show the management table 1107 and the print buffers after printing in the first to second paths has been completed and print-buffer return processing by buffer management has been performed. As it is apparent from these figures, after printing C component data in the first path and printing K component data in the second path, data in the print buffers of ID numbers "2" and "7" are cleared, values in the C and K pointer tables 1304 and 1305 are updated, and the C and K print position pointers 1308 and 1309 are moved to the next position (FIG. 22A). Further, the values in the top unused-buffer pointer 1310 and the last unused-buffer pointer 1311 are updated (FIG. 22B). The data in the print buffers of ID numbers "2" and "7" are cleared, and the buffer of the ID number "7" becomes the last unused buffer.

The management of print buffers is made as allocation and return in the above-described manner.

According to the present embodiment, the print buffers of a required number are allocated in accordance with a plurality of color component data. This efficiently utilizes the print buffers of a limited number by each color component. For example, in a case where the plurality of color component data are the same, buffer allocation is actually performed for only one color component, and ID numbers of the print buffers allocated for the one color component are stored in the respective pointer tables. Then, printing is performed with corresponding color inks based on the same data. In a case where data not to be used for printing is received or no data is received as described in the above embodiment, no print buffer is allocated, and printing is controlled with only the buffer-management by the pointer tables. In this manner, the dot pattern memory with the limited capacity can be efficiently used, thus use of efficiency of dot pattern memory can be improved.

It should be noted that in the above embodiments, the print head has the nozzles capable of printing for 8-bit data in the subscanning direction by each color component. However, the present invention is not limited to this structure. It is more preferable that the nozzle size may be corresponding to 16-bit data, 24-bit data or 32-bit data so that the MPU can easily access print data. In the above embodiments, the memory size of the management table is smaller than that corresponding to the recording sheet, however, the present invention is not limited to this construction. For example, a management table corresponding to one page size or greater may be employed and the same advantages can be attained. Furthermore, the number of print buffers and the print buffer size are not limited to those in the embodiments, but may be changed in accordance with the construction of apparatus or the like.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the print head, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the print head, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558, 333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

In addition, not only an exchangeable chip type print head, as described in the above embodiment, which can be electrically connected to the apparatus main unit and can receive an ink from the apparatus main unit upon being mounted on the apparatus main unit but also a cartridge type print head in which an ink tank is integrally arranged on the print head itself can be applicable to the present invention.

It is preferable to add recovery means for the print head, preliminary auxiliary means, and the like provided as an arrangement of the printer of the present invention since the printing operation can be further stabilized. Examples of such means include, for the print head, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated print head or by combining a plurality of print heads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid st ate, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices, or to an apparatus comprising a single device. Furthermore, the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus which performs printing by scanning a print head in a scanning direction, the print head comprising an array of printing elements arranged into a plurality of printing element groups and arrayed in a direction different from the scanning direction, comprising:

a plurality of memory means allocated into a plurality of areas of an addressable memory, said plurality of memory means for storing print data to be used for printing on a printing medium, and being provided in correspondence with the plurality of printing element groups;

a management table for storing plural identification numbers, each identification number indicating an address of the addressable memory allocated to one of said plurality of printing element groups; and control means for allocating each of the printing element groups to any one of said plurality of memory means by storing an identification number in said management table, wherein said control means is adapted to write print data corresponding to each of the printing element groups into any one of said plurality of memory means, to store an identification number into said management table indicating the address of the addressable area of the memory means where the print data has been written, to read out the print data from said plurality of memory means based on the identification numbers written in said management table, to supply the read-out print data to corresponding element groups, and to allocate a specific identification number indicating data not to be printed by the element groups where there is no print data to be printed.

2. The printing apparatus according to claim 1, wherein each of said plurality of memory means holds print data of 8-bit in the direction along the array of printing elements, for an area corresponding to a range in a scanning direction in which said print head is scanned.

3. The printing apparatus according to claim 1, wherein the identification number is allotted to each of said plurality of memory means, and wherein said control means updates the identification number in said management table in accordance with the process of printing operation, thus manages said plurality of memory means.

4. The print head according to claim 1, wherein said print head includes an ink-jet print head for performing printing by discharging an ink.

5. The print head according to claim 1, wherein said print head is a print head for discharging an ink by utilizing heat energy, and includes heat energy transducers for generating heat energy to be applied to the ink.

6. The printing apparatus according to claim 1, wherein said print head is a color print head which has printing element blocks, each including the plurality of printing elements, aligned in the scanning direction, and wherein the number of printing element blocks is corresponding to the number of plural colors of printing materials.

7. The printing apparatus according to claim 6, further comprising management tables corresponding to said plural colors of printing materials, for managing allocation of said plurality of memory means to the printing element blocks, wherein the number of management tables is corresponding to the number of said plural colors of printing materials.

8. The printing head according to claim 6, wherein the color printing head is an ink-jet printing head for performing printing by discharging an ink.

9. The printing head according to claim 6, wherein the color printing head is a printing head for discharging an ink by utilizing heat energy, and includes heat energy transducers for generating heat energy to be applied to the ink.

10. The printing apparatus according to claim 1, wherein the printing elements in the print head correspond to plural color of printing materials as blocks, the print head is scanned in a direction different from a direction along the array of the printing elements, the printing medium is transferred in a direction different from the direction along the array of printing elements by a predetermined width, and the print head performs printing operation a plural number of times on one area of the printing medium, using different colors of printing materials.

11. The printing apparatus according to claim 10, wherein said control means controls allocation of said plurality of memory means to the printing element groups and release of the allocation, and wherein said control means performs the allocation to all the color component data of the color print data at the same time, and performs the release of allocation by each color component data, using a plurality of management tables corresponding to the number of the color component data.

12. The printing apparatus according to claim 10, wherein a unique identification number, as information indicating order of the allocation is stored in each of said plurality of memory means.

13. The printing apparatus according to claim 12, wherein each of the identification numbers stored in each of said plurality of memory means is an identification number of a memory means to be allocated next, and wherein upon allocation, said control means stores the identification number of the memory means to be allocated next into a first register.

14. The printing apparatus according to claim 12, wherein said control means updates said plurality of management tables at a first timing for writing the color print data into said plurality of memory means, so as to control the allocation, and updates said plurality of management tables at a second timing for transferring the printing medium by a predetermined width, so as to control the release of allocation.

15. The printing apparatus according to claim 14, wherein at least one of the plurality of memory means is allocated by said control means at the first timing, while the memory means allocated by said control means is released at the second timing.

16. The printing apparatus according to claim 15, wherein said control means stores an identification number of the released memory means into a second register.

17. The printing apparatus according to claim 16, wherein said control means controls allocation such that the memory means having the identification number stored in the second register is allocated last.

18. The printing apparatus according to claim 10, wherein if values of respective color component data on one area are the same, said control means controls the allocation of said plurality of memory means so as to store only one color component data.

19. The printing apparatus according to claim 16, wherein if color print data not to be used for printing on the printing medium is received, said control means controls such that no memory means is allocated to any of the plurality of printing element blocks.

20. The printing head according to claim 10, wherein the color printing head is an ink-jet printing head for performing printing by discharging an ink.

21. The printing head according to claim 10, wherein the color printing head is a printing head for discharging an ink by utilizing heat energy, and includes heat energy transducers for generating heat energy to be applied to the ink.

22. The printing apparatus according to claim 8, wherein if values of respective color component data on the same area are the same, said control means controls the allocation of said plurality of memory means so as to store only one color component data.

23. A printing method for performing printing by scanning a print head in a scanning direction, the print head comprising an array of printing elements arranged into a plurality of printing element groups and arrayed in a direction different from the scanning direction, comprising the steps of:

providing a plurality of memory areas allocated into a plurality of areas of an addressable memory, said plurality of memory areas for storing print data supplied for printing on a printing medium and being provided in correspondence with the plurality of printing element groups;

providing a management table for storing plural identification numbers, each identification number indicating an address of the addressable memory allocated to one of said plurality of printing element groups, the management table storing identification numbers to allocate each of the printing element groups to any one of said plurality of memory areas;

inputting print data;

writing the input print data corresponding to each of the printing element groups into any one of the plurality of memory areas and storing identification numbers into said management table indicating the address of the addressable areas of the memory areas where the print data has been written, thereby allocating the memory areas to the element groups when the input print data includes data to be printed by the element groups, while not storing data to be printed into the memory areas when the input print data does not include data to be printed by the element groups; and reading out the print data from the memory areas based on the identification numbers corresponding to the element groups.

24. The printing apparatus according to claim 1, wherein the specific identification number indicates not allocating the element groups where there is no data to be printed, to any of said plurality of memory means.

25. The printing apparatus according to claim 24, wherein, when the identification number allocated to said management table is the specific identification number, said control means supplies data which does not cause any print operation to the element group.

26. The printing apparatus according to claim 24, wherein, when the identification number allocated to said management table is the specific identification number, said control means suppresses print operation in the element group.

27. The printing method according to claim 23, wherein said print head is a color print head which has printing element blocks, each including the plurality of printing elements aligned in the direction different from the scanning direction, and wherein the number of printing element blocks is corresponding to the number of plural colors of printing materials.

28. The printing method according to claim 27, wherein said management table includes sub-management tables corresponding to said plural colors of printing materials, the sub-management tables for managing allocation of said plurality of memory areas to the printing element blocks, and wherein the number of sub-management tables corresponds to the number of said plural colors of printing materials.

29. The printing method according to claim 23, wherein the color printing head is an ink-jet printing head for performing printing by discharging ink.

30. The printing method according to claim 23, wherein the printing elements in the print head correspond to plural colors of printing materials as blocks, the printing medium is transferred in a direction different from the direction along the array of printing elements by a predetermined width, and the print head performs printing operations a plural number of times on one area of the printing medium, using different colors of printing materials.

31. The printing method according to claim 30, wherein said control means controls allocation of said plurality of memory areas to the printing element groups and release of the allocation, and wherein said control means performs the allocation to all the color component data of the color print data at the same time, and performs the release of allocation by each color component data using a plurality of sub-management tables which are included in said management table corresponding to the number of the color component data.

32. The printing method according to claim 30, wherein if values of respective color component data on one pixel are the same, said control means controls the allocation of said plurality of memory areas so as to store only one color component data.

33. The printing method according to claim 29, wherein if values of respective color component data on the same area are the same, said control means controls the allocation of said plurality of memory areas so as to store only one color component data.

* * * * *

UNITED STATES PATENT AND TRADEMARK OFFICE
CERTIFICATE OF CORRECTION

PATENT NO. : 5,927,874

DATED : July 27, 1999

INVENTORS : Masaya Kikuta, et al.

It is certified that error appears in the above-identified patent and that said Letters Patent is hereby corrected as shown below:

COVER PAGE

Under [56] References Cited, U.S. Patent Documents, "Bockman" should read --Bockman, et al.--; and Under [56] References Cited, Foreign Patent Documents, "53-09875" should read --5-309875--.

COLUMN 9

Line 5, "printbuffer" should read --print buffer--.

COLUMN 17

Line 22, "st ate," should read --state,--.

Signed and Sealed this

Fifth Day of September, 2000

Attest:

Q. TODD DICKINSON

Attesting Officer

Director of Patents and Trademarks